United States Patent
Ono

(10) Patent No.: US 7,315,777 B2
(45) Date of Patent: Jan. 1, 2008

(54) VEHICLE CONTROL METHOD AND VEHICLE CONTROL APPARATUS

(75) Inventor: Eiichi Ono, Toyota (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/767,283

(22) Filed: Jan. 30, 2004

(65) Prior Publication Data

US 2004/0186647 A1 Sep. 23, 2004

(30) Foreign Application Priority Data

Jan. 31, 2003 (JP) ............... 2003-024177
Nov. 14, 2003 (JP) ............... 2003-385973

(51) Int. Cl.
*B60T 8/24* (2006.01)

(52) U.S. Cl. ............... 701/70; 701/72; 701/80; 701/90; 303/146; 303/148; 180/408; 180/410

(58) Field of Classification Search ............... 701/70, 701/80, 72, 73, 83, 84, 90; 303/146, 148; 180/408, 410

See application file for complete search history.

(56) References Cited

U.S. PATENT DOCUMENTS

| | | | | |
|---|---|---|---|---|
| 6,473,682 | B1 * | 10/2002 | Nakamura | 701/74 |
| 6,549,842 | B1 * | 4/2003 | Hac et al. | 701/80 |
| 6,597,980 | B2 * | 7/2003 | Kogure | 701/80 |
| 6,735,510 | B2 * | 5/2004 | Hac | 701/70 |
| 6,842,683 | B2 * | 1/2005 | Kim | 701/70 |
| 6,885,931 | B2 * | 4/2005 | Anwar | 701/72 |
| 6,925,371 | B2 * | 8/2005 | Yasui et al. | 701/72 |
| 6,971,726 | B2 * | 12/2005 | Levy et al. | 303/150 |
| 7,079,930 | B2 * | 7/2006 | Gerdes | 701/48 |
| 2001/0003805 | A1 * | 6/2001 | Koibuchi | 701/9 |
| 2001/0007965 | A1 * | 7/2001 | Yokoyama et al. | 701/70 |
| 2002/0109402 | A1 * | 8/2002 | Nakamura | 303/146 |

(Continued)

FOREIGN PATENT DOCUMENTS

JP    2000-118429    4/2000

(Continued)

*Primary Examiner*—Thomas Black
*Assistant Examiner*—Brian J. Broadhead
(74) *Attorney, Agent, or Firm*—Oblon, Spivak, McClelland, Maier & Neustadt, P.C.

(57) ABSTRACT

A target resultant force to be applied to a vehicle body is calculated, the magnitude of a critical friction circle of each wheel is estimated, and a critical resultant force is estimated from the estimated magnitude of the critical friction circle. Subsequently, a ratio of the target resultant force to a critical resultant force is set as an effective road friction, and the magnitude of a tire force is set by using the magnitude of the critical friction circle and the effective road friction. The direction of the tire force of each wheel to be controlled is set based on the sum of products, which are calculated for all other wheels, of a distance from the position of the wheel to be controlled to the position of the other wheel in a direction of the resultant force, and the magnitude of the tire force of the other wheel. Cooperative control of steering and braking or steering and driving of each wheel to be controlled is performed based on the magnitude and direction of the tire force which have been set.

28 Claims, 12 Drawing Sheets

U.S. PATENT DOCUMENTS

| | | |
|---|---|---|
| 2002/0143451 A1* | 10/2002 | Hac et al. ..................... 701/48 |
| 2002/0153770 A1* | 10/2002 | Matsuno et al. ............ 303/146 |
| 2003/0062769 A1* | 4/2003 | Matsumoto et al. ........ 303/146 |
| 2003/0074122 A1* | 4/2003 | Hac ............................ 701/70 |
| 2003/0102713 A1* | 6/2003 | Murakami .................. 303/146 |
| 2003/0218378 A1* | 11/2003 | Tanaka et al. ............... 303/146 |
| 2004/0128044 A1* | 7/2004 | Hac ............................ 701/48 |
| 2004/0162663 A1* | 8/2004 | Kogure et al. ................. 701/72 |
| 2004/0186647 A1* | 9/2004 | Ono ............................. 701/70 |
| 2005/0234628 A1* | 10/2005 | Luders et al. ................. 701/80 |

FOREIGN PATENT DOCUMENTS

| | | |
|---|---|---|
| JP | 2000-289595 | 10/2000 |
| JP | 2001-322557 | 11/2001 |

\* cited by examiner

VEHICLE MODEL

COORDINATE SYSTEM CORRESPONDING
TO RESULTANT FORCE

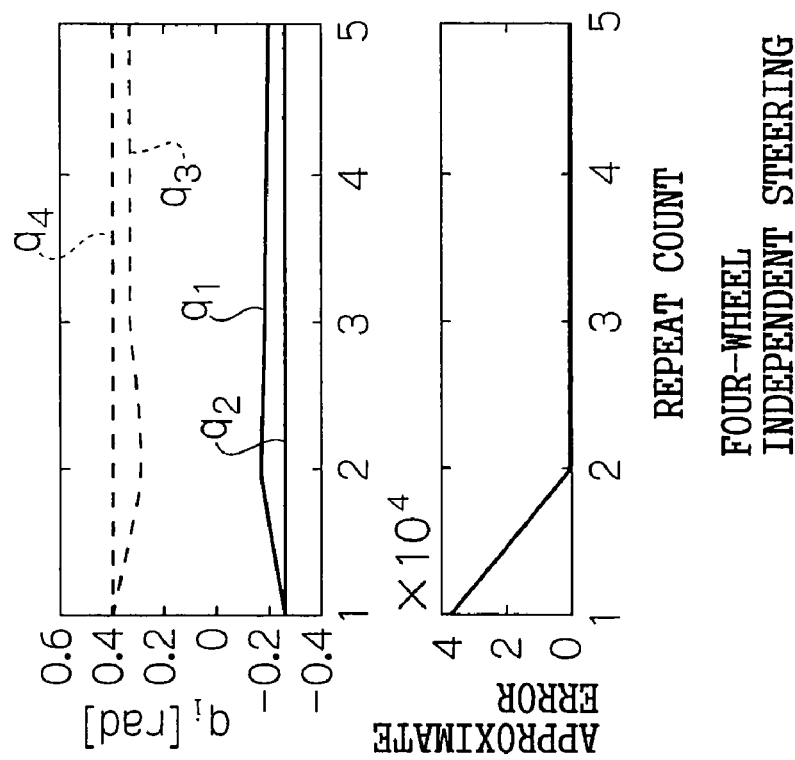
FIG.6A FRONT-WHEEL AND REAR-WHEEL STEERING
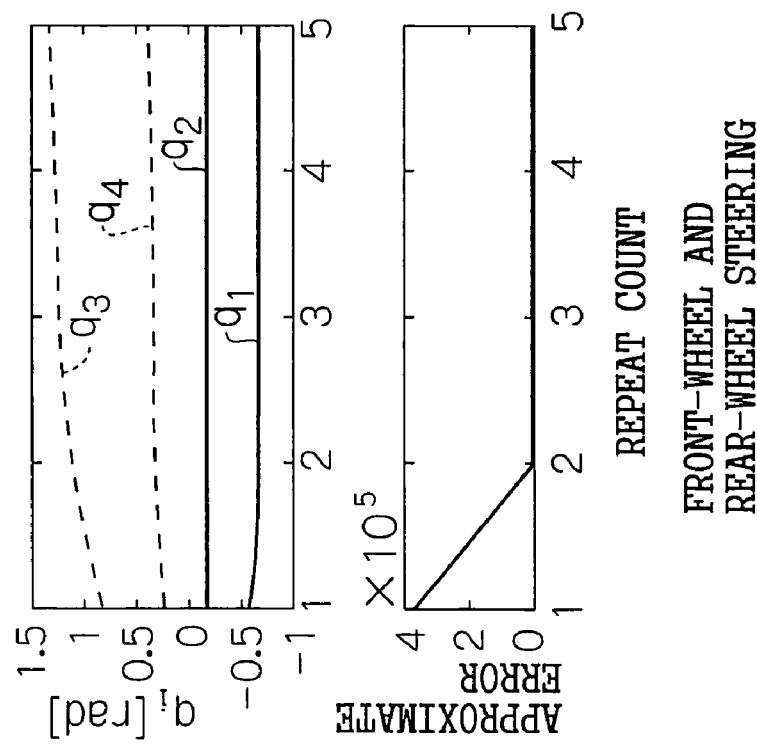
FIG.6B FOUR-WHEEL INDEPENDENT STEERING

FRONT-WHEEL AND
REAR-WHEEL STEERING

FOUR-WHEEL
INDEPENDENT STEERING

TIRE FORCE CHARACTERISTICS

TURNING CONTROL SIMULATION

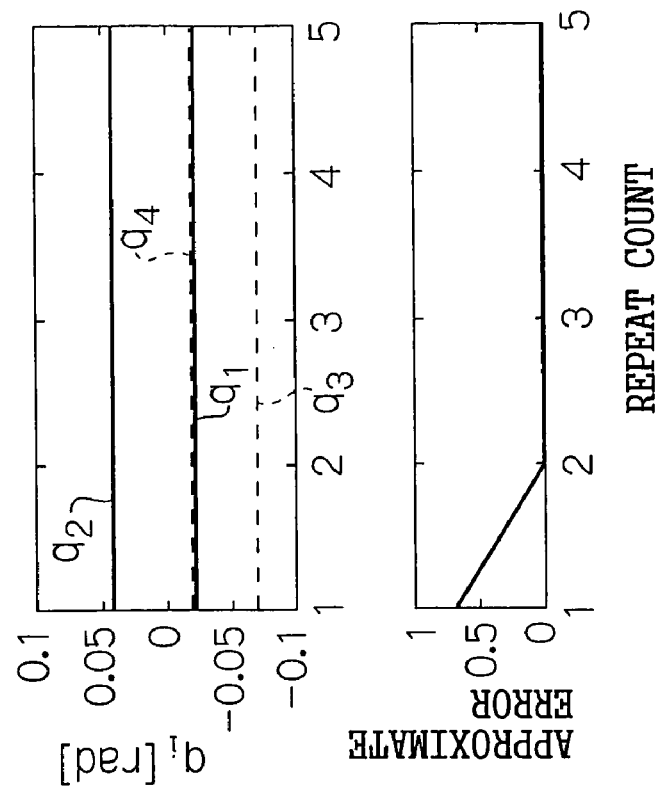
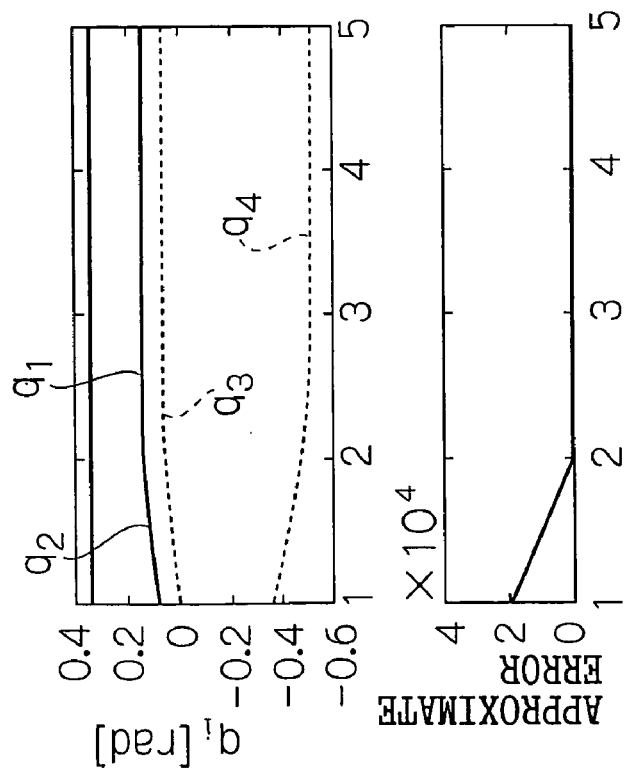
FIG.10A FRONT-WHEEL AND REAR-WHEEL STEERING
FIG.10B FOUR-WHEEL INDEPENDENT STEERING

FRONT-WHEEL AND
REAR-WHEEL STEERING

FOUR-WHEEL
INDEPENDENT STEERING

ACTUAL TIRE CHARACTERISTICS

TURNING CONTROL ON
ROAD SURFACE OF UNIFORM $\mu$

VEHICLE CONTROL METHOD AND VEHICLE CONTROL APPARATUS

CROSS-REFERENCE TO RELATED APPLICATION

This application claims priority under 35 USC 119 from Japanese Patent Application Nos. 2003-24177 and 2003-385973, the disclosures of which are incorporated by reference herein.

BACKGROUND OF THE INVENTION

1. Field of the Invention

The present invention relates to a vehicle control method and a vehicle control apparatus. Specifically, the present invention relates to a method and an apparatus for controlling a vehicle which can control a tire force, that is, a force generated between a tire and a road surface, by independently controlling each steering angle and braking force of four wheels, and a vehicle which can control a tire force by independently controlling steering angles and braking forces of front wheels and those of rear wheels.

2. Description of the Related Art

A technique for separately controlling four wheels and steering angles thereof has been known, as disclosed in Japanese Patent Application Laid-Open (JP-A) No. 2001-322557. According to this related art, when a vehicle turns, the vehicle is steered so that a steering angle of each wheel becomes 90° with respect to the center of the turn of the vehicle. Further, when a defective wheel is found, steering and braking are controlled so that the friction force of the defective wheel is decreased. This related art does not disclose cooperation of steering and braking, or cooperation of steering and driving. For example, regarding the steering angle, a fixed value is outputted as a target value regardless of braking or driving.

However, in an actual vehicle, critical friction is generated between a wheel and a road surface, and lateral force may be decreased by increasing braking force. Therefore, cooperation between steering and braking or between steering and driving is indispensable in order to use the friction force between the wheel and the road surface as efficiently as possible. However, the above related art does not mention the cooperation at all, such as adjusting steering according to braking or driving. As a result, a problem arises in that the force generated by the wheel cannot be optimized.

SUMMARY OF THE INVENTION

An object of the present invention is to solve the aforementioned problem.

In order to achieve the above object, a first aspect of the present invention may comprise: calculating a physical quantity which relates to a tire force of each wheel and optimizes an effective road friction of each wheel, based on a target resultant force to be applied to a vehicle body in order to obtain vehicle body motion that a driver desires, and a constraint including as parameters a magnitude of a critical friction circle of each wheel; calculating, based on the calculated physical quantity relating to the tire force of each wheel, a first control variable for controlling at least one of braking force and driving force of each wheel, or a second control variable for controlling the first control variable and a steering angle of each wheel; and controlling (A) the at least one of braking force and driving force of each wheel based on the first control variable, or controlling (A) the at least one of braking force and driving force of each wheel and (B) the steering angle of each wheel, based on the first and second control variables.

The constraint may be represented by a formula indicating that no resultant force is generated in a direction orthogonal to the direction of the target resultant force, and a formula indicating that a moment around the center of gravity of the vehicle is equal to a desired moment. Further, the constraint may be represented by formulae, the number of which is less than that of wheels, or a linearized formula.

The target resultant force may be represented by a secondary performance function including a magnitude of the critical friction circle of each wheel and the physical quantity relating to the tire force of each wheel. In such a case, a physical quantity relating to the tire force of each wheel, which physical quantity satisfies a first approximation formula of the formula defining the constraint and optimizes the secondary performance function, can be calculated as the physical quantity which relates to the tire force of each wheel and optimizes the effective road friction of each wheel.

Alternatively, a physical quantity relating to the tire force of each wheel, which physical quantity satisfies a first approximation formula of the formula defining the constraint and optimizes the secondary performance function, is calculated as an initial value. The formula defining the constraint is linearized by using the calculated initial value. Then a physical quantity relating to the tire force of each wheel, which physical quantity satisfies the linearized formula of the constraint and optimizes the secondary performance function, is calculated as an approximate solution. The physical quantity which relates to the tire force of each wheel and optimizes the effective road friction of each wheel can be calculated by using the calculated approximate solution as the initial value to repeat the linearization of the formula defining the constraint and the calculation of the approximate solution.

The formula defining the constraint may be linearized by Taylor expansion around the initial value or the approximate solution.

The physical quantity relating to the tire force may be a direction of the tire force. The effective road friction of each wheel, the calculated direction of the tire force of each wheel, and the magnitude of the critical friction circle of each wheel can be used to calculate a slip angle based on a brush model, and the calculated slip angle can be used to calculate the second control variable based on a vehicle motion model.

The magnitude of the critical friction circle of each wheel can be determined based on an estimate or a virtual value of a coefficient of friction $\mu$ of each wheel and load of each wheel.

The direction of the tire force which optimizes the effective road friction of each wheel may be one of: a direction of the tire force which uniformly minimizes the effective road friction of each wheel; a direction of the tire force which makes the effective road friction of the front wheel differ from that of the rear wheel; and a direction of the tire force which makes the magnitude of the tire force of each wheel proportional to the load of the wheel.

When the magnitude of the tire force proportional to the load of the wheel cannot be obtained because each wheel has a different p with respect to a road surface, the magnitude of the critical friction circle may be used as the magnitude of the tire force for a wheel having a small $\mu$, and the magnitude of the tire force which minimizes the effective road friction may be used for a wheel having a large $\mu$.

The steering angle may be controlled so as to be the same for the right and left wheels. The effective road friction may be represented by the magnitude of the target resultant force relative to the magnitude of a critical resultant force obtained from the magnitude of the critical friction circle of each wheel.

The direction of the tire force which is generated by each wheel may be defined as a value, that is the sum of products, which are calculated for all other wheels, of a distance from the position of an object wheel to the position of the other wheel in the direction of the resultant force, and the magnitude of the critical friction circle of the other wheel, with the direction of the resultant force acting on the vehicle body as the resultant force of the tire forces of the respective wheels being used as a reference.

A second aspect of the present invention may comprise: target resultant force calculating means for calculating a target resultant force to be applied to a vehicle body in order to obtain a vehicle body motion that a driver desires; critical friction circle estimating means for estimating the magnitude of a critical friction circle of each wheel; tire force calculating means for calculating a physical quantity which relates to a tire force of each wheel and optimizes an effective road friction of each wheel, based on the target resultant force and a constraint including as parameters the magnitude of the critical friction circle of each wheel; control variable calculating means for calculating, based on the calculated physical quantity relating to the tire force of each wheel, a first control variable for controlling at least one of braking force and driving force of each wheel, or a second control variable for controlling the first control variable and a steering angle of each wheel; and control means for controlling (A) the at least one of braking force and driving force of each wheel based on the first control variable, or controlling (A) the at least one of braking force and driving force of each wheel and (B) the steering angle of each wheel based on the first and second control variables.

Further, a third aspect of the present invention may comprise: target resultant force calculating means for calculating a target resultant force to be applied to a vehicle body in order to obtain a vehicle body motion that a driver desires; critical friction circle estimating means for estimating a magnitude of a critical friction circle of each wheel; critical resultant force estimating means for estimating a critical resultant force based on the magnitude of the critical friction circle of each wheel estimated by the critical friction circle estimating means; effective road friction setting means for setting a ratio of the target resultant force to the critical resultant force as an effective road friction; magnitude of tire force setting means for setting a magnitude of a tire force used at each wheel, which tire force is obtained by multiplying the magnitude of the critical friction circle of each wheel by the effective road friction; direction of tire force setting means for setting a direction of the tire force generated by each wheel based on a value, that is a sum of products, which are calculated for all other wheels, of a distance from the position of an object wheel to the position of the other wheel in a direction of the resultant force, and the magnitude of the critical friction circle of the other wheel, with the direction of the resultant force acting on the vehicle body as the resultant force generated by the tire force of each wheel being used as a reference; and control means for controlling a steering angle of each wheel and at least one of braking force and driving force of each wheel based on the magnitude and direction of the tire force which have been set.

BRIEF DESCRIPTION OF THE DRAWINGS

FIG. 6A is a diagram showing calculated directions of tire forces of respective wheels, and the number of times calculations are repeated, in the case of front-wheel and rear-wheel steering. FIG. 6B is a diagram showing calculated directions of tire forces of respective wheels, and the number of times calculations are repeated, in the case of four-wheel independent steering.

FIG. 10A is a diagram showing calculated directions of tire forces of respective wheels, and the number of times calculations are repeated, in the case of front-wheel and rear-wheel steering. FIG. 10B is a diagram showing calculated directions of tire forces of respective wheels, and the number of times calculations are repeated, in the case of four-wheel independent steering.

DETAILED DESCRIPTION OF THE INVENTION

A preferred embodiment of the present invention will be described in detail below with reference to the drawings. First, a principle of cooperative control of steering and braking in a vehicle which enables independent steering and braking of four wheels, and a principle of cooperative control of steering and driving in a vehicle which enables independent steering and driving of four wheels will be described.

Figure 1:
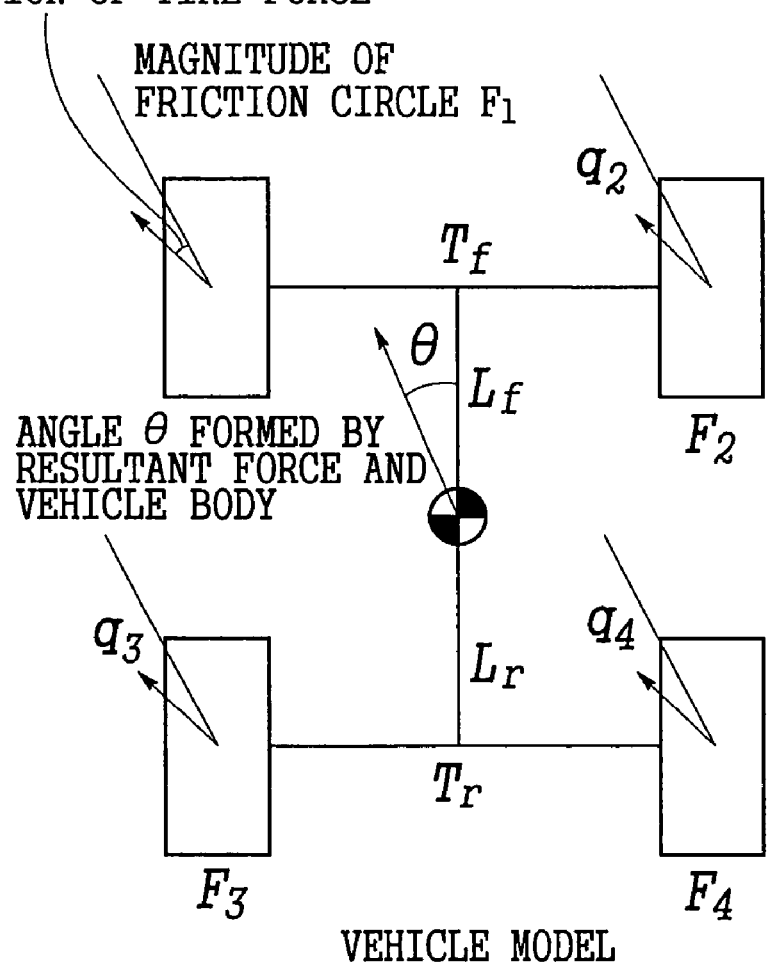
FIG. 1 is a schematic view of a vehicle motion model.

In a motion model of a four-wheel-drive vehicle shown in FIG. 1, a direction $\theta$ in which a force is applied to a vehicle body as a resultant force, which is the sum of forces generated by four wheels, in order to obtain a vehicle body motion that a driver desires, and the magnitude (radius) $F_i$ of a critical friction circle of each wheel (wherein i=1 to 4) are known. (i=1 represents a left front wheel, i=2 represents a right front wheel, i=3 represents a left rear wheel, and i=4 represents a right rear wheel.) In this case, the direction of the tire force which maximizes the resultant force, namely, acceleration (or deceleration) generated by the vehicle body, while securing a desired yaw moment, is determined for each wheel. The direction of the tire force of each wheel is represented by an angle $q_i$, which is formed by the direction of the resultant force and the direction of a force generated by a single wheel (i.e., the tire force of each wheel).

Figure 3:
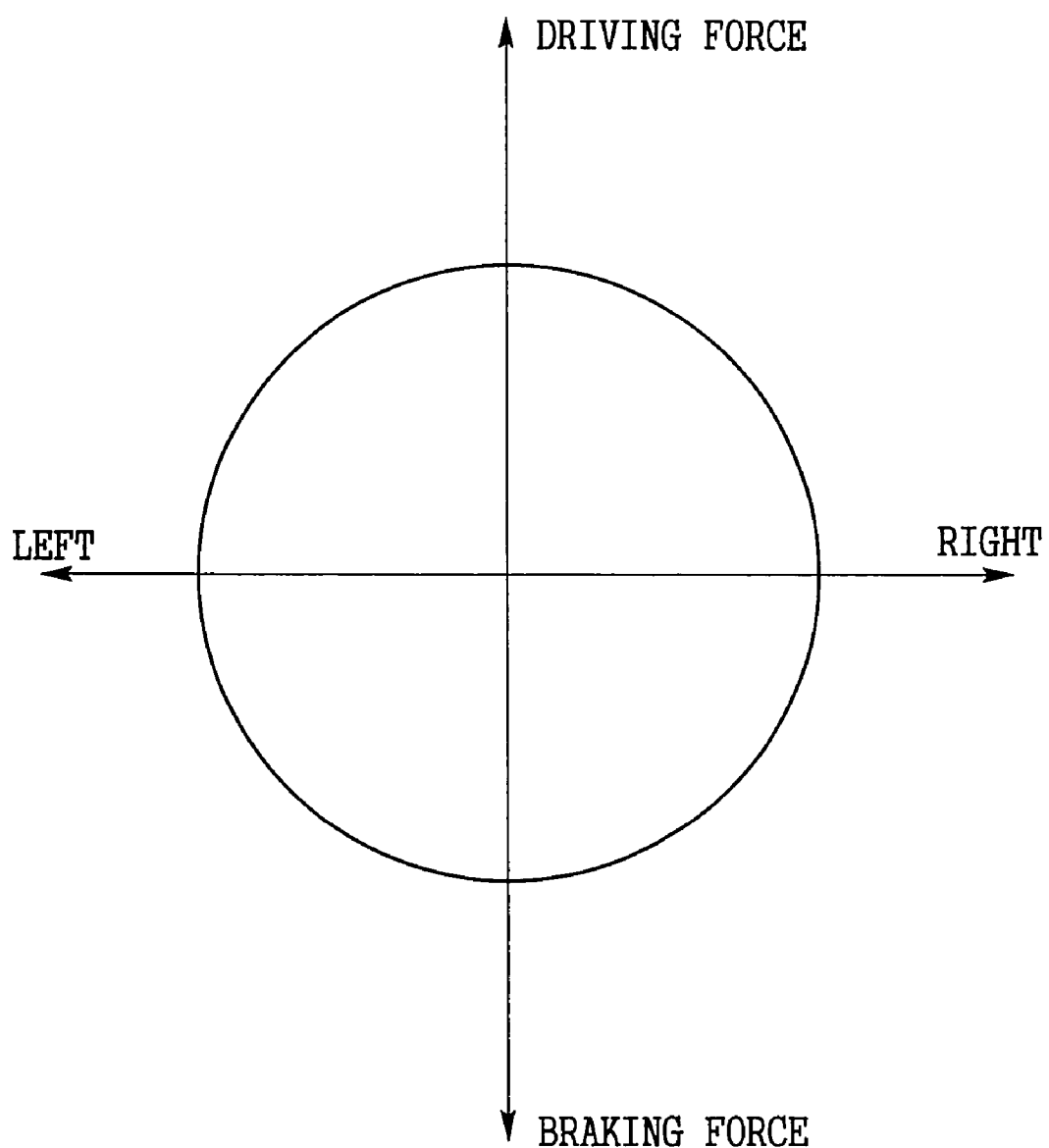
FIG. 3 is a diagram of a critical friction circle.

The critical friction circle is a circle representing the limit in which motion performance of the vehicle can be controlled without losing grip of a tire. The magnitude of the critical friction circle represents the maximum friction force of a tire generated between the wheel and a road surface, and is determined based on an estimate or a virtual value of μ (friction coefficient) and load of each wheel. The friction force of the tire is formed by a force in a direction in which the vehicle advances (driving force or braking force) and a friction force in a lateral direction (rightward or leftward). The friction force in either direction becomes 100% of the magnitude of the critical friction circle, or corresponds thereto, the friction force in the other direction becomes zero. The braking force is applied in a direction opposite to the direction in which the driving force is generated. The range of the direction force can be represented as a substantial circular shape when represented as a vector diagram as shown in FIG. 3. For this reason, the range of the friction force is referred to as the critical friction circle.

Figure 2:
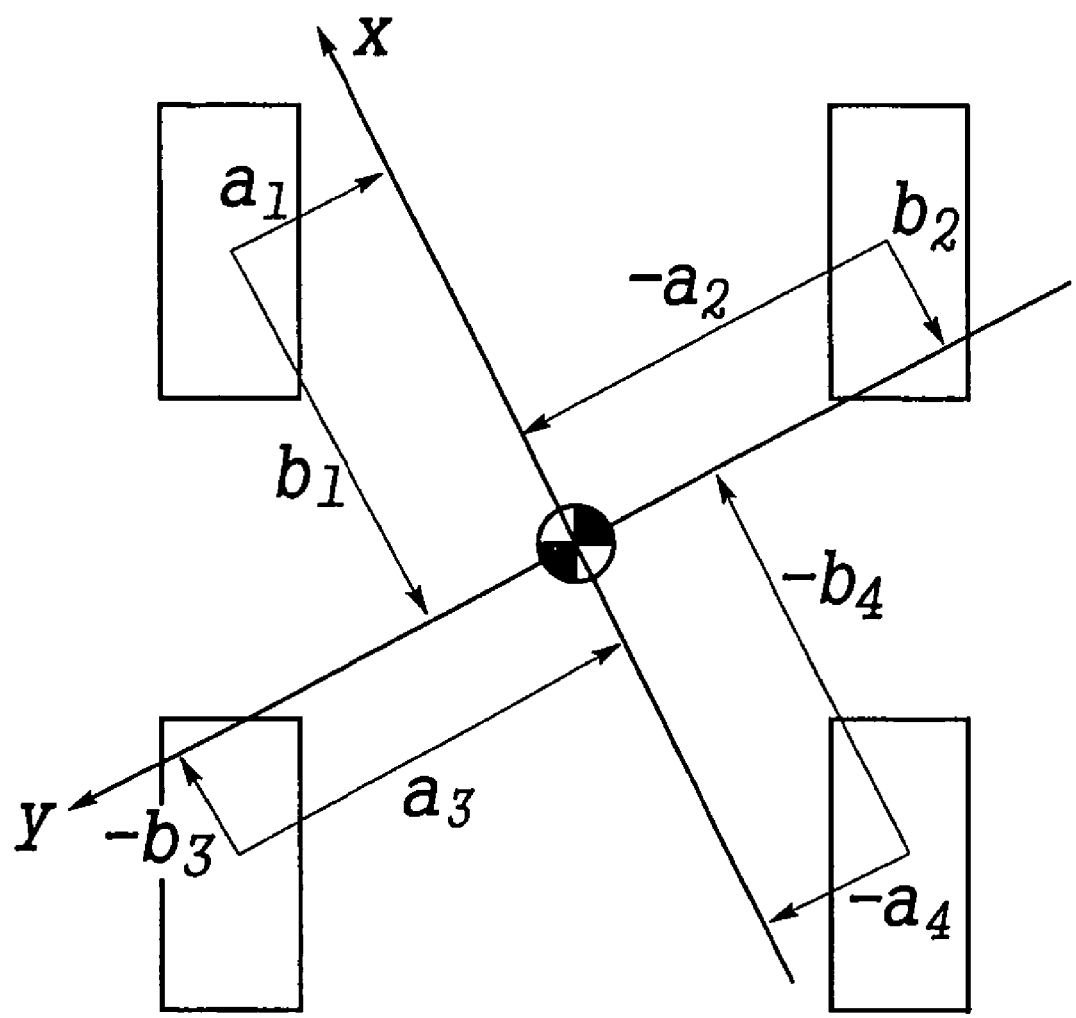
FIG. 2 is a schematic view of a coordinate system corresponding to a resultant force generated in the vehicle motion model in FIG. 1.

When the motion model of the four-wheel-drive vehicle in FIG. 1 is converted into a coordinate shown in FIG. 2 with an X-axis being a direction of the resultant force and a Y-axis being a direction perpendicular to the X-axis, the position of each tire, i.e., (x, y)=($b_i$, $a_i$), can be represented by the following formulae (1) to (8).

$$a_1 = \frac{T_f}{2}\cos\theta - L_f \sin\theta \quad (1)$$

$$a_2 = -\frac{T_f}{2}\cos\theta - L_f \sin\theta \quad (2)$$

$$a_3 = \frac{T_r}{2}\cos\theta + L_r \sin\theta \quad (3)$$

$$a_4 = -\frac{T_r}{2}\cos\theta + L_r \sin\theta \quad (4)$$

$$b_1 = \frac{T_f}{2}\sin\theta + L_f \cos\theta \quad (5)$$

$$b_2 = -\frac{T_f}{2}\sin\theta + L_f \cos\theta \quad (6)$$

$$b_3 = \frac{T_r}{2}\sin\theta - L_r \cos\theta \quad (7)$$

$$b_4 = -\frac{T_r}{2}\sin\theta - L_r \cos\theta \quad (8)$$

In the formulae, $T_f$ is an interval between front wheels, Tr is an interval between rear wheels, $L_f$ is a distance between the center of gravity of the vehicle and a middle point of the interval between the front wheels, and $L_r$ is a distance between the center of gravity of the vehicle and a middle point of the interval between the rear wheels $a_i$ and $b_i$ represent a distance from the X-axis and the Y-axis, respectively.

Further, assuming that $M_z$ represents a yaw moment (desired moment) to be generated around the center of gravity of the vehicle at this time, constraints represented by the following formulae (9) and (10) exist for the angle $q_i$, which represents the direction of the tire force of each wheel.

$$F_1 \sin q_1 + F_2 \sin q_2 + F_3 \sin q_3 + F_4 \sin q_4 = 0 \quad (9)$$

$$-a_1 F_1 \cos q_1 - a_2 F_2 \cos q_2 - a_3 F_3 \cos q_3 - a_4 F_4 \cos q_4 + b_1 F_1 \sin q_1 + b_2 F_2 \sin q_2 + b_3 F_3 \sin q_3 + b_4 F_4 \sin q_4 = M_z \quad (10)$$

The formula (9) represents a constraint indicating that resultant force is not generated in the Y-axis direction, namely, a direction orthogonal to the direction of the resultant force. The formula (10) represents a constraint indicating that the moment around the center of gravity of the vehicle is a desired yaw moment $M_z$. The number of the formulae representing these constraints is less than the number of the wheels.

Therefore, the problem of maximizing the resultant force, namely, the problem of maximizing an effective road friction, becomes a problem of determining the angle $q_i$ which satisfies the constraints of the formulae (9) and (10) and maximizes the sum (resultant force) J of forces in the X-axis direction represented by the following formula (11).

$$J = F_1 \cos q_1 + F_2 \cos q_2 + F_3 \cos q_3 + F_4 \cos q_4 \quad (11)$$

This problem can be solved as a nonlinear optimization problem by numerical calculation of convergence, which will be described later. Alternatively, a solution can be derived from approximation described as follows.

First, the formulae (9) and (10) representing the constraints are subjected to primary approximation to obtain the following formulae (12) and (13).

$$F_1 q_1 + F_2 q_2 + F_3 q_3 + F_4 q_4 = 0 \quad (12)$$

$$b_1 F_1 q_1 + b_2 F_2 q_2 + b_3 F_3 b_3 + b_4 F_4 q_4 = M_z + a_1 F_1 + a_2 F_2 + a_3 F_3 + a_4 F_4 \quad (13)$$

The formula (11) is further subjected to secondary approximation to obtain a secondary performance function represented by the following formula (14).

$$J = F_1 - \frac{F_1}{2}q_1^2 + F_2 - \frac{F_2}{2}q_2^2 + F_3 - \frac{F_3}{2}q_3^2 + F_4 - \frac{F_4}{2}q_4^2 \quad (14)$$

Further, the problem of determining the angle $q_i$ which maximizes the secondary performance function represented by the formula (14) can be replaced with a problem of determining the angle $q_i$ which minimizes the sum (K/2) of negative terms in the formula (14), namely, a problem of determining the angle $q_i$ which minimizes a secondary performance function represented by a formula (15).

Namely, the problem of maximizing the effective road friction becomes a problem of determining the angle $q_i$ which maximizes the secondary performance function that is represented by the formula (14) and includes the magnitude of the critical friction circle of each wheel and the direction of the tire force of each wheel, or a problem of determining the angle $q_i$ which minimizes the secondary performance function that is represented by the following formula (15) and includes the magnitude of the critical friction circle of each wheel and the direction of the tire force of each wheel, namely, a problem of determining the angle $q_i$ which optimizes the effective road friction.

$$K=F_1q_1^2+F_2q_2^2+F_3q_3^2+F_4q_4^2 \quad (15)$$

Variables in the formula (15) are changed by using the following formula (16).

$$p_i=\sqrt{F_i}q_i \quad (16)$$

The formula (15) is represented by the following formula (17).

$$K=p_1^2+p_2^2+p_3^2+p_4^2 \quad (17)$$

As a result, the above problem turns out to be replaced with a problem of determining a value $p_i$ of the minimum Euclidean norm which satisfies the following formulae (18) and (19).

$$\sqrt{F_1}p_1+\sqrt{F_2}p_2+\sqrt{F_3}p_3+\sqrt{F_4}p_4=0 \quad (18)$$

$$b_1\sqrt{F_1}p_1+b_2\sqrt{F_2}p_2+b_3\sqrt{F_3}p_3+b_4\sqrt{F_4}p_4=M_z+a_1F_1+a_2F_2+a_3F_3+a_4F_4 \quad (19)$$

$p_i$ can be solved as in the following formula (20).

$$\begin{bmatrix}q_1\\q_2\\q_3\\q_4\end{bmatrix} = diag\begin{bmatrix}\frac{1}{\sqrt{F_1}} & \frac{1}{\sqrt{F_2}} & \frac{1}{\sqrt{F_3}} & \frac{1}{\sqrt{F_4}}\end{bmatrix} \cdot \begin{bmatrix}p_1\\p_2\\p_3\\p_4\end{bmatrix}$$

$$= diag\begin{bmatrix}\frac{1}{\sqrt{F_1}} & \frac{1}{\sqrt{F_2}} & \frac{1}{\sqrt{F_3}} & \frac{1}{\sqrt{F_4}}\end{bmatrix} \cdot$$

$$\begin{bmatrix}\sqrt{F_1} & \sqrt{F_2} & \sqrt{F_3} & \sqrt{F_4}\\ b_1\sqrt{F_1} & b_2\sqrt{F_2} & b_3\sqrt{F_3} & b_4\sqrt{F_4}\end{bmatrix}^+ \cdot$$

$$\begin{bmatrix}0\\M_z+a_1F_1+a_2F_2+a_3F_3+a_4F_4\end{bmatrix}$$

$$= \frac{M_z+a_1F_1+a_2F_2+a_3F_3+a_4F_4}{b_1c_1F_1+b_2c_2F_2+b_3c_3F_3+b_4c_4F_4} \cdot \begin{bmatrix}c_1\\c_2\\c_3\\c_4\end{bmatrix} \quad (20)$$

The formula (20) satisfies the following formulae (21) to (24).

$$c_1=(b_1-b_2)F_2+(b_1-b_3)F_3+(b_1-b_4)F_4 \quad (21)$$

$$c_1=(b_2-b_1)F_1+(b_2-b_3)F_3+(b_2-b_4)F_4 \quad (22)$$

$$c_3=(b_3-b_1)F_1+(b_3-b_2)F_2+(b_3-b_4)F_4 \quad (23)$$

$$c_4=(b_4-b_1)F_1+(b_4-b_2)F_2+(b_4-b_3)F_3 \quad (24)$$

Further, "diag" in the formula (20) represents a diagonal matrix with values in the parentheses being diagonal elements. "+" represents a pseudoinverse matrix. When A is a long full rank matrix, the pseudoinverse matrix of A can be calculated by the following formula (25).

$$A^+=(A \cdot A^T)^{-1}A^T \quad (25)$$

As will be described later, the angle $q_i$ derived from the above formulae (20) to (24) is directly used as the direction of the tire force of each wheel when the effective road friction γ is 1, in integrated control of the steering angle and the braking force or the steering angle and the driving force.

Further, the formulae (21) to (24) respectively represent the sum of products, which are calculated for all other wheels, of the distance from the position of the wheel where the angle $q_i$ is determined to the position of the other wheel in the direction of the resultant force of the vehicle body (e.g., $(b_1-b_2)$, $(b_1-b_3)$, $(b_1-b_4)$ for a wheel with i=1), and the magnitude of the critical friction circle of the other wheel. Thus, these formulae represent that the angle $q_i$ formed by the direction of the tire force of each wheel and the direction of the resultant force of the vehicle body is proportional to the sum of the products, which are calculated for all other wheels, of the distance from the position of the wheel where the angle $q_i$ is determined to the position of the other wheel in the direction of the resultant force of the vehicle body, and the magnitude of the critical friction circle of the other wheel.

Furthermore, $a_i$ or $b_i$ representing the position of each wheel is a function of the direction θ of the resultant force of the vehicle body. Therefore, the angle $q_i$ formed by the direction of the tire force of each wheel and the direction of the resultant force of the vehicle body can be represented as a function of the direction of the resultant force of the vehicle body and the magnitude of the critical friction force of each wheel.

The angle $q_i$ derived as described above can also be used as an initial value for the formulae (9) to (11) for convergence calculation of the nonlinear optimization. Generally, in the nonlinear optimization problem, convergence in the convergence calculation tends to accelerate by using a value near the optimal value as an initial value. For this reason, solutions of the formulae (20) to (24) can be used as the initial values in the nonlinear optimization problem to increase the efficiency of calculation.

In the nonlinear optimization problem mentioned herein, Taylor expansion around approximate solutions derived from the formulae (20) to (24) for the formulae (9) and (10) is carried out to derive solutions therefrom. Further, Taylor expansion around the solutions for the formulae (9) and (10) is repeated to derive solutions. Consequently, approximate solutions of high accuracy are derived.

First, the angle $q_i$ is derived, as an initial value $q_{i0}$, from the first Taylor expansion, using the formulae (20) to (24), for the formulae (9) and (10). The following formulae (26) and (27) are derived from Taylor expansion around the initial value $q_{i0}$.

$$F_1\{\sin q_{10}+(q_1-q_{10})\cos q_{10}\}+F_2\{\sin q_{20}+(q_2-q_{20})\cos q_{20}\}+F_3\{\sin q_{30}+(q_3-q_{30})\cos q_{30}\}+F_4\{\sin q_{40}+(q_4-q_{40})\cos q_{40}\}=0 \quad (26)$$

$$-a_1F_1\{\cos q_{10}-(q_1-q_{10})\sin q_{10}\}-a_2F_2\{\cos q_{20}-(q_2-q_{20})\sin q_{20}\}-a_3F_3\{\cos q_{30}-(q_3-q_{30})\sin q_{30}\}-a_4F_4\{\cos q_{40}-(q_4-q_{40})\sin q_{40}\}+b_1F_1\{\sin q_{10}+(q_1-q_{10})\cos q_{10}\}+b_2F_2\{\sin q_{20}+(q_2-q_{20})\cos q_{20}\}+b_3F_3\{\sin q_{30}+(q_3-q_{30})\cos q_{30}\}+b_4F_4\{\sin q_{40}+(q_4-q_{40})\cos q_{40}\}=M_z \quad (27)$$

A solution which satisfies these formulae (26) and (27) and also minimizes the formula (15) is derived from the following formula (28), in which the pseudoinverse matrix described above is used.

$$\begin{bmatrix}q_1\\q_2\\q_3\\q_4\end{bmatrix} = diag\begin{bmatrix}\frac{1}{\sqrt{F_1}} & \frac{1}{\sqrt{F_2}} & \frac{1}{\sqrt{F_3}} & \frac{1}{\sqrt{F_4}}\end{bmatrix} \cdot \quad (28)$$

-continued
$$\begin{bmatrix} \sqrt{F_1}\cos q_{10} & \sqrt{F_2}\cos q_{20} & \sqrt{F_3}\cos q_{30} & \sqrt{F_4}\cos q_{40} \\ \sqrt{F_1}(a_1\sin q_{10}+b_1\cos q_{10}) & \sqrt{F_2}(a_2\sin q_{20}+b_2\cos q_{20}) & \sqrt{F_3}(a_3\sin q_{30}+b_3\cos q_{30}) & \sqrt{F_4}(a_4\sin q_{40}+b_4\cos q_{40}) \end{bmatrix}^+ \cdot$$

$$\begin{bmatrix} \sum_{i=1}^{4} F_i(q_{i0}\cos q_{i0} - \sin q_{i0}) \\ M_z + \sum_{i=1}^{4} F_i\{(a_i+b_iq_{i0})\cos q_{i0} + (a_iq_{i0}-b_i)\sin q_{i0}\} \end{bmatrix}$$

Next, solutions which satisfy the formula obtained by the Taylor expansion around approximate solutions of the formula (28) and minimize the formula (15) are derived by using the pseudoinverse matrix, as described above. Subsequently, Taylor expansion and derivation of approximate solutions are repeated a predetermined number of times to derive an angle $q_i$ of high accuracy.

The accuracy of optimization can be improved by repeatedly performing calculations with the formula (28) being used as a recurrence formula, namely, by using the $q_i$, which has been calculated in the previous step, as $q_{i0}$ in the next step and repeating Taylor expansion and the calculation of $q_i$.

Next, cooperative control of steering and braking and of steering and driving before a limit will be described. Cooperation of a steering system and a braking system, and cooperation of a steering system and a driving system for improving critical motion performance (i.e., the force generated by the vehicle body) have been described above. A cooperation method for extending the control rules obtained above to a range before the limit and maximizing the grip margin of each wheel will be described below.

When the effective road friction of each wheel is expressed as $\gamma$, constraints of a force generated by the vehicle body in a lateral direction and a yaw direction are represented by the following formulae, which are similar to the formulae (9) and (10), respectively.

$\gamma F_1 \sin q_1 + \gamma F_2 \sin q_2 + \gamma F_3 \sin q_3 + \gamma F_4 \sin q_4 = 0$ $-a_1\gamma F_1 \cos q_1 - a_2\gamma F_2 \cos q_2 - a_3\gamma F_3 \cos q_3 - a_4\gamma F_4 \cos q_4 + b_1\gamma F_1 \sin q_1 + b_2\gamma F_2 \sin q_2 + b_3\gamma F_3 \sin q_3 + b_4\gamma F_4 \sin q_4 = M_z$ Namely, the constraints are represented by the following formulae (29) and (30).

$F_1 \sin q_1 + F_2 \sin q_2 + F_3 \sin q_3 + F_4 \sin q_4 = 0$ (29)

$$-a_1 F_1 \cos q_1 - a_2 F_2 \cos q_2 - a_3 F_3 \cos q_3 - a_4 F_4 \cos q_4 + \quad (30)$$
$$b_1 F_1 \sin q_1 + b_2 F_2 \sin q_2 + b_3 F_3 \sin q_3 + b_4 F_4 \sin q_4 = \frac{M_z}{\gamma}$$

Further, the magnitude of the force generated by the vehicle body is represented by the following formula as a constraint.

$\gamma F_1 \cos q_1 + \gamma F_2 \cos q_2 + \gamma F_3 \cos q_3 + \gamma F_4 \cos q_4 = F$ Namely, the constraint is represented by the following formula (31).

$$F_1 \cos q_1 + F_2 \cos q_2 + F_3 \cos q_3 + F_4 \cos q_4 = \frac{F}{\gamma} \quad (31)$$

Therefore, the cooperation method for uniformly maximizing the grip margin of each wheel becomes a problem of determining the angle $q_i$ which satisfies the formulae (29) to (31) and minimizes the effective road friction $\gamma$. Further, when $F \neq 0$, the problem can be considered as a problem of determining the angle $q_i$ which satisfies the above formula (29) and the following formula (32) obtained by organizing the formulae (30) and (31), and maximizes the following formula (33).

$$b_1 F_1 \sin q_1 + b_2 F_2 \sin q_2 + b_3 F_3 \sin q_3 + b_4 F_4 \sin q_4 = \quad (32)$$
$$\left(a_1 + \frac{M_z}{F}\right) F_1 \cos q_1 + \left(a_2 + \frac{M_z}{F}\right) F_2 \cos q_2 +$$
$$\left(a_3 + \frac{M_z}{F}\right) F_3 \cos q_3 + \left(a_4 + \frac{M_z}{F}\right) F_4 \cos q_4$$

$$J = \frac{F}{\gamma} = F_1 \cos q_1 + F_2 \cos q_2 + F_3 \cos q_3 + F_4 \cos q_4 \quad (33)$$

When an approximate solution is derived in the same way as described above, the formulae (29) and (32) are represented by the following formulae (34) and (35), respectively, after primary approximation.

$F_1 q_1 + F_2 q_2 + F_3 q_3 + F_4 q_4 = 0$ (34)

$$b_1 F_1 q_1 + b_2 F_2 q_2 + b_3 F_3 q_3 + b_4 F_4 q_4 = \quad (35)$$
$$\left(a_1 + \frac{M_z}{F}\right) F_1 + \left(a_2 + \frac{M_z}{F}\right) F_2 + \left(a_3 + \frac{M_z}{F}\right) F_3 + \left(a_4 + \frac{M_z}{F}\right) F_4$$

Further, the formula (33) corresponds with the secondary performance function of the formula (14) by secondary approximation. For this reason, as described above, variables are changed by using the formula (16), and the problem is replaced with a problem of determining a value $p_i$ of the minimum Euclidean norm which satisfies the following formulae (36) and (37).

$\sqrt{F_1}p_1 + \sqrt{F_2}p_2 + \sqrt{F_3}p_3 + \sqrt{F_4}p_4 = 0$ (36)

$$b_1\sqrt{F_1}\,p_1 + b_2\sqrt{F_2}\,p_2 + b_3\sqrt{F_3}\,p_3 + b_4\sqrt{F_4}\,p_4 = \quad (37)$$
$$\left(a_1 + \frac{M_z}{F}\right) F_1 + \left(a_2 + \frac{M_z}{F}\right) F_2 + \left(a_3 + \frac{M_z}{F}\right) F_3 + \left(a_4 + \frac{M_z}{F}\right) F_4$$

The value $p_i$ can be solved by the following formula (38).

$$\begin{bmatrix} q_1 \\ q_2 \\ q_3 \\ q_4 \end{bmatrix} = \text{diag}\begin{bmatrix} \frac{1}{\sqrt{F_1}} & \frac{1}{\sqrt{F_2}} & \frac{1}{\sqrt{F_3}} & \frac{1}{\sqrt{F_4}} \end{bmatrix} \cdot \begin{bmatrix} p_1 \\ p_2 \\ p_3 \\ p_4 \end{bmatrix} \quad (38)$$

$$= \text{diag}\begin{bmatrix} \frac{1}{\sqrt{F_1}} & \frac{1}{\sqrt{F_2}} & \frac{1}{\sqrt{F_3}} & \frac{1}{\sqrt{F_4}} \end{bmatrix} \cdot$$

$$\begin{bmatrix} \sqrt{F_1} & \sqrt{F_2} & \sqrt{F_3} & \sqrt{F_4} \\ b_1\sqrt{F_1} & b_2\sqrt{F_2} & b_3\sqrt{F_3} & b_4\sqrt{F_4} \end{bmatrix}^+ \cdot$$

$$\begin{bmatrix} 0 \\ \frac{M_z}{F}(F_1+F_2+F_3+F_4) + a_1F_1 + a_2F_2 + a_3F_3 + a_4F_4 \end{bmatrix}$$

$$= \frac{\frac{M_z}{F}(F_1+F_2+F_3+F_4) + a_1F_1 + a_2F_2 + a_3F_3 + a_4F_4}{b_1c_1F_1 + b_2c_2F_2 + b_3c_3F_3 + b_4c_4F_4} \cdot \begin{bmatrix} c_1 \\ c_2 \\ c_3 \\ c_4 \end{bmatrix}$$

The formula (38) satisfies the following formulae (39) to (42).

$$c_1 = (b_1-b_2)F_2 + (b_1-b_3)F_3 + (b_1-b_4)F_4 \quad (39)$$

$$c_2 = (b_2-b_1)F_1 + (b_2-b_3)F_3 + (b_2-b_4)F_4 \quad (40)$$

$$c_3 = (b_3-b_1)F_1 + (b_3-b_2)F_2 + (b_3-b_4)F_4 \quad (41)$$

$$c_4 = (b_4-b_1)F_1 + (b_4-b_2)F_2 + (b_4-b_3)F_3 \quad (42)$$

As described above, "diag" represents a diagonal matrix, and "+" represents a pseudoinverse matrix. The angle $q_i$ derived from the formulae (38) to (42) may be directly used in integrated control of steering and braking or steering and driving, as the direction of the tire force of each wheel, or may be used as an initial value for the formulae (29) to (31) for convergence calculation of the nonlinear optimization. In the same way as described above, a recurrence formula for determining an approximate solution of high accuracy by repeated calculation based on the Taylor expansion is given as the following formula (43).

$$\begin{bmatrix} q_1 \\ q_2 \\ q_3 \\ q_4 \end{bmatrix} = \text{diag}\begin{bmatrix} \frac{1}{\sqrt{F_1}} & \frac{1}{\sqrt{F_2}} & \frac{1}{\sqrt{F_3}} & \frac{1}{\sqrt{F_4}} \end{bmatrix} \cdot \quad (43)$$

$$\begin{bmatrix} \sqrt{F_1}\cos q_{10} & \sqrt{F_2}\cos q_{20} & \sqrt{F_3}\cos q_{30} & \sqrt{F_4}\cos q_{40} \\ \sqrt{F_1}(a_1\sin q_{10}+b_1\cos q_{10}) & \sqrt{F_2}(a_2\sin q_{20}+b_2\cos q_{20}) & \sqrt{F_3}(a_3\sin q_{30}+b_3\cos q_{30}) & \sqrt{F_4}(a_4\sin q_{40}+b_4\cos q_{40}) \end{bmatrix}^+ \cdot$$

$$\begin{bmatrix} \sum_{i=1}^{4} F_i(q_{i0}\cos q_{i0} - \sin q_{i0}) \\ \sum_{i=1}^{4} F_i\left\{\left(a_i + b_iq_{i0} + \frac{M_z}{F}\right)\cos q_{i0} + (a_iq_{i0} - b_i)\sin q_{i0}\right\} \end{bmatrix}$$

The effective road friction $\gamma$ is calculated based on the formula (44) in which the angle $q_i$ thus derived is used. Namely, the effective road friction $\gamma$ is represented as a ratio of a target resultant force (i.e., force of the vehicle body) F to a critical resultant force obtained from the magnitude of the critical friction circle of each wheel (i.e., resultant force in the direction of the target resultant force, which resultant force is the sum of critical forces obtained from the magnitude of the critical friction circle of each wheel).

$$\gamma = \frac{F}{F_1\cos q_1 + F_2\cos q_2 + F_3\cos q_3 + F_4\cos q_4} \quad (44)$$

Moreover, braking or driving force of each wheel is derived from the following formula (45) by using the effective road friction $\gamma$, and the magnitude $F_i$ of the critical friction circle of each wheel, and the direction $(q_i+\theta)$ of the tire force of each wheel. $\gamma F_i$ represents the magnitude of the tire force.

$$F_{xi} = \gamma F_i \cos(q_i+\theta) \quad (45)$$

Further, lateral force applied to each wheel is derived from the following formula (46).

$$F_{yi} = \gamma F_i \sin(q_i+\theta) \quad (46)$$

The steering angle of each wheel is calculated based on, for example, a brush model and a vehicle motion model. The brush model is a model which describes a characteristic of the tire force based on a theoretical formula. Assuming that the tire force is generated in accordance with the brush model, a slip angle $\beta_i$ can be determined by the following formula (47), using the magnitude of the critical friction circle of each wheel, the effective road friction $\gamma$, and the direction of the tire force of each wheel $(q_i+\theta)$.

$$\beta_i = \tan^{-1}\left(\frac{K_s}{K_\beta} \cdot \frac{-k_i\sin(q_i+\theta)}{1-k_i\cos(q_i+\theta)}\right) \quad (47)$$

The slip angle $\beta_i$ satisfies the following formula (48).

$$k_i = \frac{3F_i}{K_s}\left(1-(1-\gamma)^{\frac{1}{3}}\right) \quad (48)$$

In the above formulae (47) and (48), $K_s$ represents driving stiffness, and $K_\beta$ represents cornering stiffness.

Further, a steering angle $\delta_i$ of each wheel is calculated from the slip angle based on the vehicle motion model. Namely, the steering angle can be calculated as in the following formulae (49) to (52) by using yaw angle speed $r_0$ and a vehicle body slip angle $\beta_0$, which are calculated as target vehicle motion state variables from vehicle speed v, the steering angle, accelerator stroke, braking effort, and the like. $\beta_1$ to $\beta_4$ represent the slip angles of the respective wheels in the formula (47).

$$\delta_1 = \beta_0 + \frac{L_f}{v}r_0 - \beta_1 \qquad (49)$$

$$\delta_2 = \beta_0 + \frac{L_f}{v}r_0 - \beta_2 \qquad (50)$$

$$\delta_3 = \beta_0 - \frac{L_f}{v}r_0 - \beta_3 \qquad (51)$$

$$\delta_4 = \beta_0 - \frac{L_f}{v}r_0 - \beta_4 \qquad (52)$$

When cooperation of steering control and braking and driving control is carried out, braking force and driving force are controlled based on first control variables, which are the braking force and driving force determined by the above formula (45). The steering angle, namely, the direction of the tire force, is controlled based on second control variables, which are the steering angles determined in the formulae (49) to (52). Alternatively, either the braking force or the driving force may be controlled while the direction of the tire force is controlled.

When the cooperation of the steering control and the braking and driving control is carried out based on this type of control, the effective road friction γ of each wheel can be uniformly minimized all the time, and motion performance allowing the greatest robust against disturbance such as a road surface or cross wind can be obtained.

Further, when the resultant force to be applied to the vehicle body is maximized, the braking force and the driving force of each wheel can be determined by the formula (45) when the effective road friction γ of each wheel is 1, and the steering angles of the respective wheels can be determined by the formulae (49) to (52) when the effective road friction γ of each wheel in the formula (48) is 1.

The braking force, the driving force and the steering angle of each wheel determined above are used as the control variables to control the cooperation of the driving force and the steering angle of the vehicle or the cooperation of the braking force and the steering angle.

Only the braking force and the driving force may be calculated to control the driving force, the braking force, or both the braking force and the driving force. Namely, only the magnitude of the tire force may be controlled without controlling the steering angle.

Next, a case will be described in which the cooperative control is applied to a normal four-wheel vehicle and carried out by using the same steering angle for the right and left wheels. In the case of the conventional four-wheel vehicle having the same steering angle for the right and left wheels, constraints represented by the following formulae (53) and (54) and indicating that the right and left wheels have the same slip angle are further added.

$$\tan^{-1}\left(\frac{K_s}{K_\beta} \cdot \frac{-k_1 \sin(q_1+\theta)}{1-k_1\cos(q_1+\theta)}\right) = \tan^{-1}\left(\frac{K_s}{K_\beta} \cdot \frac{-k_2\sin(q_2+\theta)}{1-k_2\cos(q_2+\theta)}\right) \qquad (53)$$

$$\tan^{-1}\left(\frac{K_s}{K_\beta} \cdot \frac{-k_3\sin(q_3+\theta)}{1-k_3\cos(q_3+\theta)}\right) = \tan^{-1}\left(\frac{K_s}{K_\beta} \cdot \frac{-k_4\sin(q_4+\theta)}{1-k_4\cos(q_4+\theta)}\right) \qquad (54)$$

These constraints can be organized into the following formulae (55) and (56).

$$k_2\sin(q_2+\theta)-k_1\sin(q_1+\theta)-k_1k_2\sin(q_2-q_1)=0 \qquad (55)$$

$$k_4\sin(q_4+\theta)-k_3\sin(q_3+\theta)-k_3k_4\sin(q_4-q_3)=0 \qquad (56)$$

After primary approximation, these constraints are represented by the following formulae (57) and (58).

$$-k_1(\cos\theta-k_2)q_1+k_2(\cos\theta-k_1)q_2=(k_1-k_2)\sin\theta \qquad (57)$$

$$-k_3(\cos\theta-k_4)q_3+k_4(\cos\theta-k_3)q_4=(k_3-k_4)\sin\theta \qquad (58)$$

As described above, constraints such as the following formulae (59) and (60) are used when the effective road friction γ is 1, namely, when the force of the vehicle body is maximized.

$$F_1\sin q_1+F_2\sin q_2+F_3\sin q_3-a_4F_4\cos q_4=0 \qquad (59)$$

$$\begin{array}{l}-a_1F_1\cos q_1-a_2F_2\cos q_2-a_3F_3\cos q_3-a_4F_4\cos\\ q_4+b_1F_1\sin q_1+b_2F_2\sin q_2+b_3F_3\sin q_3+b_4F_4\\ \sin q_4=M_z\end{array} \qquad (60)$$

Therefore, an approximate solution is derived from the following formula (61).

$$\begin{bmatrix}q_1\\q_2\\q_3\\q_4\end{bmatrix} = \begin{bmatrix}F_1 & F_2 & F_3 & F_4\\b_1F_1 & b_2F_2 & b_3F_3 & b_4F_4\\-k_1(\cos\theta-k_2) & k_2(\cos\theta-k_1) & 0 & 0\\0 & 0 & -k_3(\cos\theta-k_4) & k_4(\cos\theta-k_3)\end{bmatrix}^{-1} \cdot \begin{bmatrix}0\\M_z+a_1F_1+a_2F_2+a_3F_3+a_4F_4\\(k_1-k_2)\sin\theta\\(k_3-k_4)\sin\theta\end{bmatrix} \qquad (61)$$

Further, when the force F of the vehicle body is applied with the effective road friction γ being 1 or less, the formula (32) is used instead of the formula (60). Furthermore, the effective road friction γ is determined by the following formula.

$$\gamma = \frac{F}{F_1+F_2+F_3+F_4}$$

An approximate solution is derived from the following formula (62) by using the effective road friction γ determined above.

$$\begin{bmatrix} q_1 \\ q_2 \\ q_3 \\ q_4 \end{bmatrix} = \begin{bmatrix} F_1 & F_2 & F_3 & F_4 \\ b_1 F_1 & b_2 F_2 & b_3 F_3 & b_4 F_4 \\ -k_1(\cos\theta - k_2) & k_2(\cos\theta - k_1) & 0 & 0 \\ 0 & 0 & -k_3(\cos\theta - k_4) & k_4(\cos\theta - k_3) \end{bmatrix}^{-1} \cdot \qquad (62)$$

$$\begin{bmatrix} 0 \\ \frac{M_z}{F}(F_1 + F_2 + F_3 + F_4) + a_1 F_1 + a_2 F_2 + a_3 F_3 + a_4 F_4 \\ (k_1 - k_2)\sin\theta \\ (k_1 - k_2)\sin\theta \end{bmatrix}$$

The braking force, the driving force and the steering angle at this time are calculated in the formulae (45) and (47) to (52). However, the same value is obtained in the formulae (46) to (49) for the steering angles of the right and left wheels. The solutions of the formulae (61) and (62) are derived by primary approximation. As described above, these solutions may be used as the initial values for the corresponding nonlinear equation for numerical calculation, and the control based on a solution thus obtained may be carried out. When the repeated calculations using the above-described Taylor expansion are applied to the formula (61), an approximate solution is represented by the following formula (63).

The formula (63) satisfies the following formula.

$$d_1 = k_1\{\sin(q_{10} + \theta) - q_{10}\cos(q_{10} + \theta)\} -$$

$$k_2\{\sin(q_{20} + \theta) - q_{20}\cos(q_{20} + \theta)\} +$$

$$k_1 k_2\{\sin(q_{20} - q_{10}) - (q_{20} - q_{10})\cos(q_{20} - q_{10})\}$$

$$d_2 = k_3\{\sin(q_{30} + \theta) - q_{30}\cos(q_{30} + \theta)\} -$$

$$k_4\{\sin(q_{40} + \theta) - q_{40}\cos(q_{40} + \theta)\} +$$

$$k_3 k_4\{\sin(q_{40} - q_{30}) - (q_{40} - q_{30})\cos(q_{40} - q_{30})\}$$

$q_{iO}$: value obtained in the previous step $$\begin{bmatrix} q_1 \\ q_2 \\ q_3 \\ q_4 \end{bmatrix} = \begin{bmatrix} F_1 \cos q_{10} & F_2 \cos q_{20} & F_3 \cos q_{30} & F_4 \cos q_{40} \\ a_1 F_1 \sin q_{10} + b_1 F_1 \cos q_{10} & a_2 F_2 \sin q_{20} + b_2 F_2 \cos q_{20} & a_3 F_3 \sin q_{30} + b_3 F_3 \cos q_{30} & a_4 F_4 \sin q_{40} + b_4 F_4 \cos q_{40} \\ -k_1\{\cos(q_{10} + \theta) - k_2\cos(q_{20} - q_{10})\} & k_2\{\cos(q_{20} + \theta) - k_1\cos(q_{20} - q_{10})\} & 0 & 0 \\ 0 & 0 & k_3\{\cos(q_{30} + \theta) - k_4\cos(q_{40} - q_{30})\} & k_4\{\cos(q_{40} + \theta) - k_3\cos(q_{40} - q_{30})\} \end{bmatrix}^{-1} \cdot \qquad (63)$$

$$\begin{bmatrix} \sum_{i=1}^{4} F_i(q_{iO}\cos q_{iO} - \sin q_{iO}) \\ M_z + \sum_{i=1}^{4} F_i\{(a_i + b_i q_{iO})\cos q_{iO} + (a_i q_{iO} - b_i)\sin q_{iO}\} \\ d_1 \\ d_2 \end{bmatrix}$$

Further, when the repeated calculations using the Taylor expansion are applied to the formula (62), an approximate solution is represented by the following formula (64).

$$\begin{bmatrix} q_1 \\ q_2 \\ q_3 \\ q_4 \end{bmatrix} = \begin{bmatrix} F_1\cos q_{10} & F_2\cos q_{20} \\ a_1 F_1\sin q_{10} + b_1 F_1\cos q_{10} - & a_2 F_2\sin q_{20} + b_2 F_2\cos q_{20} \\ k_1\{\cos(q_{10}+\theta) - k_2\cos(q_{20}-q_{10})\} & k_2\{\cos(q_{20}+\theta) - k_1\cos(q_{20}-q_{10})\} \\ 0 & 0 \end{bmatrix} \tag{64}$$

$$\begin{matrix} F_3\cos q_{30} & F_4\cos q_{40} \\ a_3 F_3\sin q_{30} + b_3 F_3\cos q_{30} & a_4 F_4\sin q_{40} + b_4 F_4\cos q_{40} \\ 0 & 0 \\ k_3\{\cos(q_{30}+\theta) - k_4\cos(q_{40}-q_{30})\} & k_4\{\cos(q_{40}+\theta) - k_3\cos(q_{40}-q_{30})\} \end{matrix}^{-1}.$$

$$\begin{bmatrix} \sum_{i=1}^{4} F_i(q_{i0}\cos q_{i0} - \sin q_{i0}) \\ \sum_{i=1}^{4} F_i\left\{\left(a_i + b_i q_{i0} + \frac{M_z}{F}\right)\cos q_{i0} + (a_i q_{i0} - b_i)\sin q_{i0}\right\} \\ d_1 \\ d_2 \end{bmatrix}$$

Figure 4:
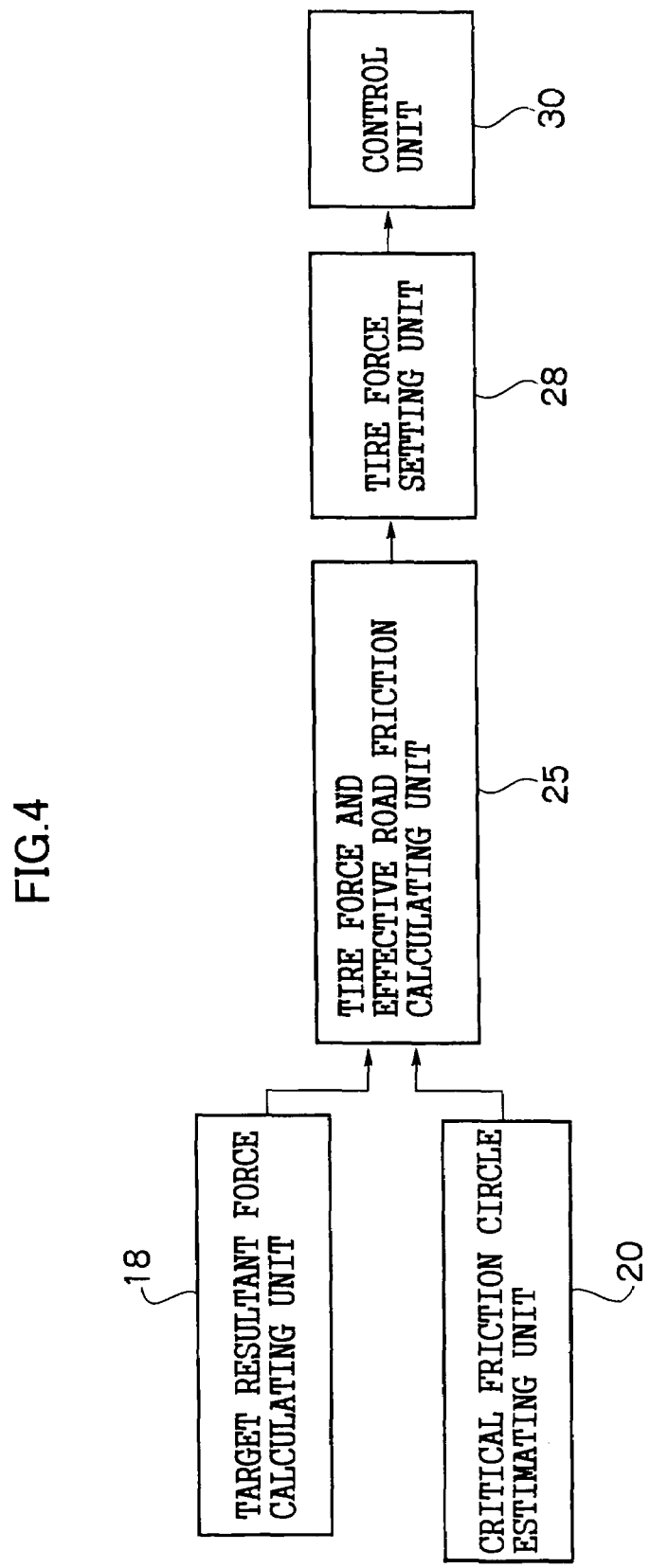
FIG. 4 is a block diagram of a first specific structure according to an embodiment of the present invention.

Next, the first specific structure of the present embodiment using the above principle will be described based on FIG. 4. As shown in the drawing, the present embodiment includes a target resultant force calculating unit 18 for calculating the magnitude and direction of a target resultant force; a critical friction circle estimating unit 20 for estimating the magnitude (radius) of a critical friction circle of each wheel; a direction of tire force and effective road friction calculating unit 25 for calculating the direction of force generated by each wheel and the effective road friction based on the magnitude and direction of the target resultant force and the magnitude of the critical friction force of each wheel; a tire force setting unit 28 for setting the magnitude of the tire force generated by each wheel; and a control unit 30 connected to a cooperative braking and driving apparatus.

The target resultant force calculating unit 18 calculates, from the steering angle, the vehicle speed, the accelerator stroke, the braking effort, and the like, the magnitude and direction of a resultant force and a yaw moment to be applied to the vehicle body in order to obtain a vehicle body motion that the driver desires. The magnitude and direction of the resultant force and the yaw moment can be determined by, for example, calculating the magnitude and direction of the resultant force and the yaw moment which are necessary to approximate to zero deviations from a yaw angle speed, which is a target vehicle motion state variable set in accordance with the operation of the driver, and from a measured value (or an estimate) of the slip angle of the vehicle body.

The critical friction circle estimating unit 20 estimates the magnitude of the critical friction circle of each wheel based on SAT (self-aligning torque) or a wheel speed.

The direction of the tire force and effective road friction calculating unit 25 calculates the direction of the tire force and the effective road friction of each wheel based on the above constraints including as parameters the magnitude and direction of the target resultant force and the magnitude of the critical friction circle of each wheel. In this case, the direction of the tire force may be calculated so that the effective road friction of each wheel is uniformly minimized, or may be calculated so that the magnitude of the tire force of each wheel is minimized in accordance with a load distribution ratio.

When the magnitude of the tire force proportional to a wheel load cannot be calculated because each wheel has a different μ with respect to the road surface, the magnitude of the critical friction circle may be used as the magnitude of the tire force of the wheel having a small μ, and the magnitude of the tire force obtained with the smallest effective road friction may be used for the wheel having a large μ.

As described above, the direction of the tire force of each wheel can be determined based on linear algebraic equations, the number of which is less than the number of wheels. Further, when the effective road friction of each wheel is uniformly minimized, as described above, the direction of the tire force can be determined based on the sum of products, which are calculated for all other wheels, of the distance from the position of an object wheel, the direction of the force of which is to be determined, to other wheel, which distance is in a direction in which a resultant force is applied to the vehicle body as the resultant force of the tire forces, and the magnitude of the critical friction circle of the other wheel.

The tire force setting unit 28 calculates the steering angle, the braking force and the driving force of each wheel based on the direction of the tire force of each wheel for optimizing the effective road friction.

The control unit 30 controls a steering actuator, a braking actuator and a driving actuator so that the steering angle, the braking force, and the driving force calculated by the tire force setting unit 28 are obtained.

Figure 5:
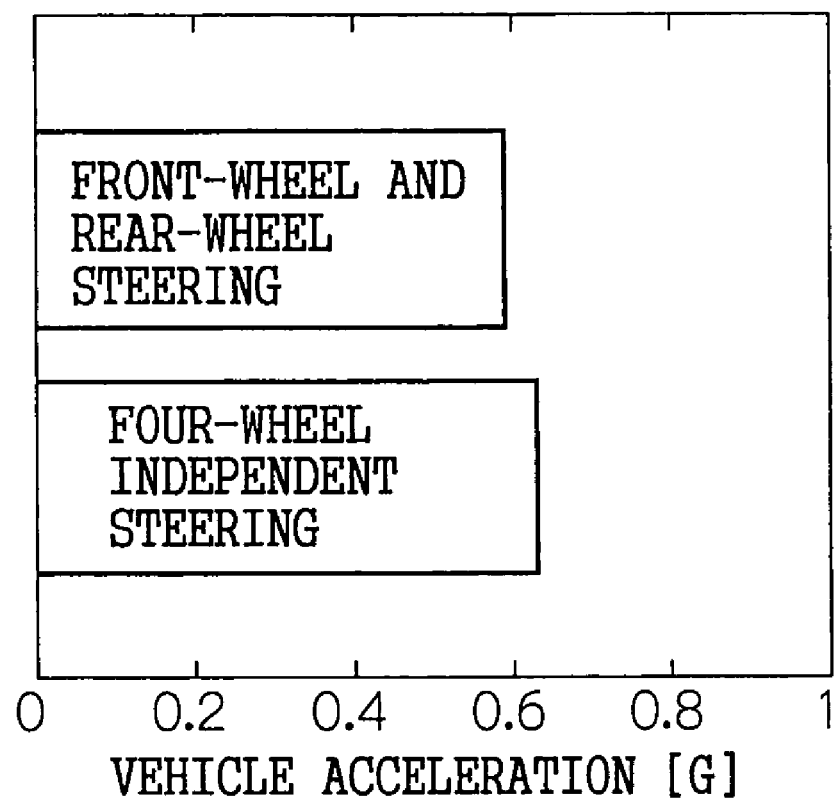
FIG. 5 is a diagram showing the results of simulation, indicating a comparison of vehicle accelerations when, in the first specific structure, the brake is applied to a vehicle which advances straight such that one side of the vehicle travels on a snowy road surface and the other side of the vehicle travels on a dry road surface.

FIG. 5 is a diagram showing the results of calculation, by simulation, of the comparison of vehicle accelerations [G] when, in the first specific structure described above, the brake is applied to the vehicle which advances straight such that one side of the vehicle travels on a snowy road surface having a μ of 0.3 and the other side of the vehicle travels on a dry road surface having a μ of 1.0. In this case, control based on the formulae (28) and (63) is carried out in four-wheel independent steering and front-wheel and rear-wheel steering, respectively, and it can be understood that braking force is increased by 8% in the four-wheel independent steering.

Figure 7A:
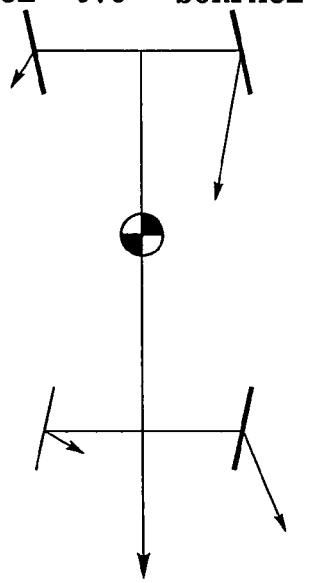
FIGS. 7A and 7B are diagrams showing vectors of the tire forces of the respective wheels and the steering angles of the respective wheels after convergence.
Figure 7B:
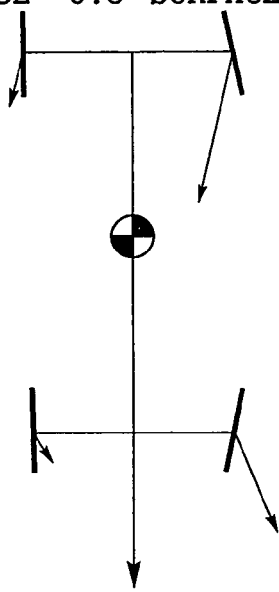

FIGS. 6A and 6B are diagrams showing the number of calculations repeated of the direction of the tire force, which calculations are based on the formulae (28) and (63), respectively. FIGS. 7A and 7B are diagrams each showing a vector of the tire force and a steering angle of each wheel after convergence.

It can be understood from FIGS. 6A and 6B that the direction of the force generated by each wheel converges in a second or third calculation. Further, it can be understood from FIG. 7B that, in the case of the four-wheel independent steering, a lateral force canceling a moment is generated at a wheel having a high μ, which wheel has relatively large friction allowance.

Figure 8:
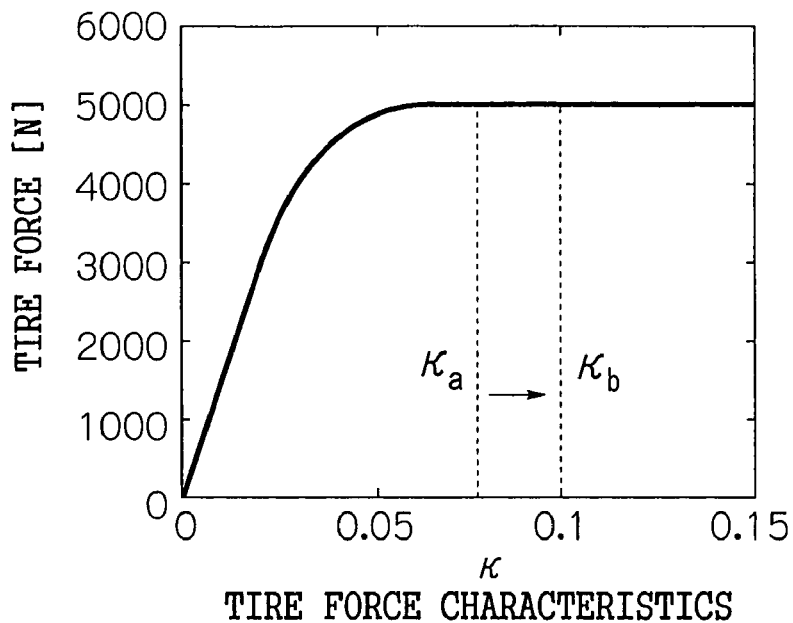
FIG. 8 is a diagram showing tire force characteristics.

The front-wheel and rear-wheel steering shown in FIG. 7A adopts a control rule which uses an edge of the friction circle ($k_a$ in a tire characteristics shown in FIG. 8). However, considering the use of a slip area ($k_b$ in the tire characteristics shown in FIG. 8) which is further than the edge, the direction of the tire force can be changed without changing the steering angle.

In this case, the direction of the tire force of each wheel, which is the solution for the four-wheel independent steering, can be realized by a front-wheel and rear-wheel steering vehicle. The acceleration generated by the vehicle body which is equivalent to that of the four-wheel independent steering can be obtained by the following logic.

First, a slip angle and a steering angle are determined based on the calculated value of the direction of the tire force of a wheel having a high μ (a control rule of the four-wheel independent steering). The wheel of high μ outputs a braking force and a driving force which are the same as those in the four-wheel independent steering.

Next, a slip ratio for making the slip angles of the wheels of high μ correspond to each other and obtaining the direction of the tire force calculated from the control rule of the four-wheel independent steering is determined as follows. When a low μ and a high μ are represented by subscripts i and j, respectively, a condition in which the slip angles of the right and left wheels correspond to each other is represented by the following formula:

$$\tan^{-1}\left(\frac{K_s}{K_\beta} \cdot \frac{-k_i \sin(q_i + \theta)}{1 - k_i \cos(q_i + \theta)}\right) = \tan^{-1}\left(\frac{K_s}{K_\beta} \cdot \frac{-k_j \sin(q_j + \theta)}{1 - k_j \cos(q_j + \theta)}\right) \text{ provided that } k_j = \frac{3F_j}{K_s}. \quad (65)$$

In the above formula (65), $q_i$ and $q_j$ are solutions (directions of the tire force) derived by assuming the four-wheel independent steering. These solutions are used as follows to solve $k_i$.

$$k_i = \frac{3F_j \sin(q_j + \theta)}{K_s \sin(q_i + \theta) + 3F_j \sin(q_j - q_i)} \quad (66)$$

The slip ratio (in a longitudinal direction of the vehicle) is calculated as follows.

$$k_{xi} = k_i \cos(q_i + \theta) = \frac{3F_j \sin(q_j + \theta)\cos(q_i + \theta)}{K_s \sin(q_i + \theta) + 3F_j \sin(q_j - q_i)} \quad (67)$$

Further, the braking force or the driving force is given by the following formula.

$$F_{xi} = F_i \cos(q_i + \theta) \quad (68)$$

Figure 9:
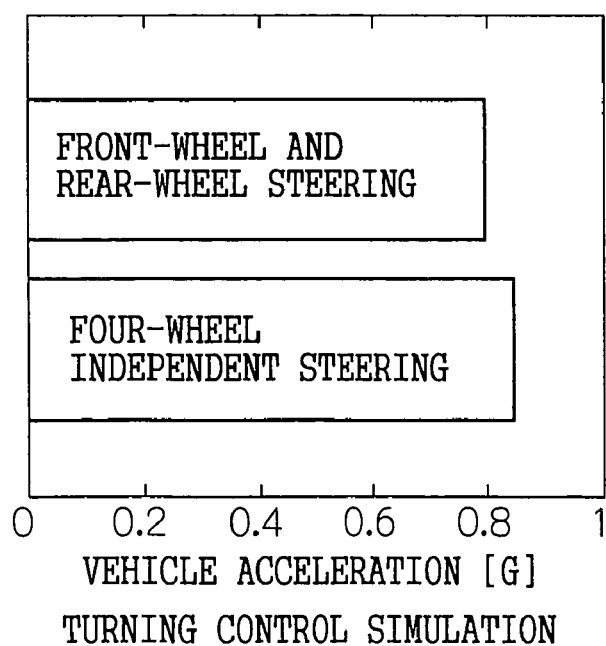
FIG. 9 is a diagram showing the results of simulation, indicating a comparison of critical vehicle accelerations when the brake is applied to a vehicle which is turning such that one side of the vehicle travels on a wet road surface and the other side of the vehicle travels on a dry road surface.

FIG. 9 is a diagram showing the results of calculating, by simulation, the comparison of critical accelerations [G] (the directions of the resultant force) during such turning and braking that the resultant force is generated in a direction of θ=120° on a wet road surface having a μ of 0.8 for outer wheels and a dry road surface having a μ of 1.0 for inner wheels.

"FRONT-WHEEL AND REAR-WHEEL STEERING" indicates an acceleration of the vehicle when the steering angles of the front and rear wheels and the braking forces of the respective four wheels are determined based on the formula (63) in the vehicle structured such that the right wheel and the left wheel are steered at the same angle. Further, "FOUR-WHEEL INDEPENDENT STEERING" indicates an acceleration of a vehicle when the direction of the force generated by each wheel is determined based on the formula (28). It can be seen that the acceleration generated by the vehicle body under these conditions is increased by 5% in the four-wheel independent steering.

Figure 11A:
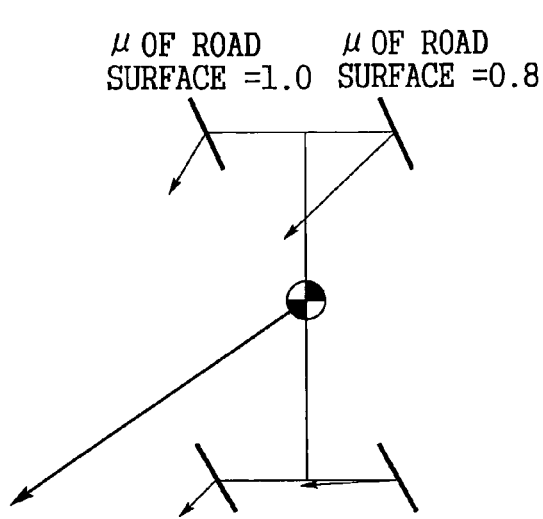
FIGS. 11A and 11B are diagrams showing vectors of the tire forces of the respective wheels and the steering angles of the respective wheels after convergence.
Figure 11B:
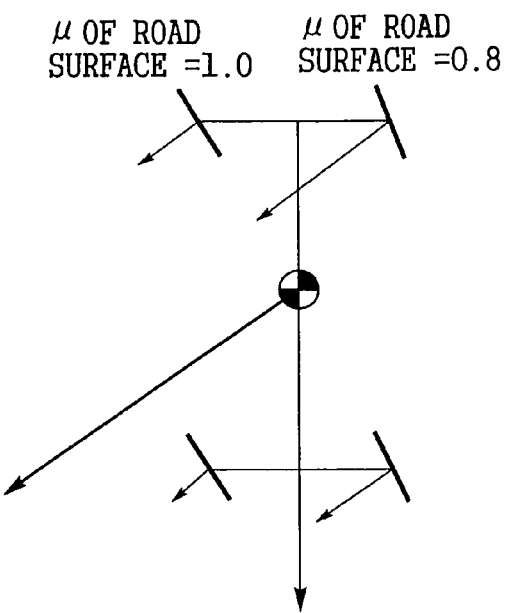

FIGS. 10A and 10B are diagrams showing the number of calculations repeated of the direction of the tire force of each wheel, which calculations are based on the formulae (28) and (63), respectively. FIGS. 11A and 11B are diagrams each showing a vector of the tire force and an steering angle of each wheel after convergence. It can be seen that, in the case of the four-wheel independent steering, the steering angles of the outer wheels having a small μ are smaller than those of the inner wheels. Cornering power (CP), dependency of lateral force on the load, a change in susgeometry, and the like are not considered in this simulation.

Figure 12:
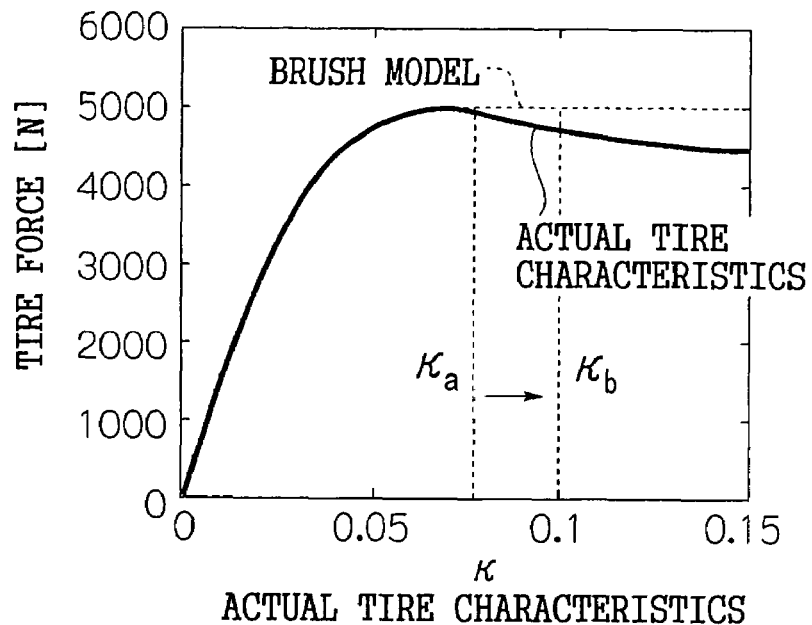
FIG. 12 is a diagram showing comparison between tire characteristics derived based on a brush model, which theoretically describes the tire force, and actual tire characteristics.

In this simulation as well, the front-wheel and rear-wheel steering shown in FIG. 10A adopts the control rule which uses the edge of the friction circle ($k_a$ in the tire characteristic in FIG. 8). However, considering the use of the slip area further than the edge ($k_b$ in the tire characteristics in FIG. 8), the direction of the tire force can be changed without changing the steering angle. Therefore, as in the case of the vehicle advancing straight such that the one side and the other side of the vehicle travel on different types of road surface, the front-wheel and rear-wheel steering vehicle, in which the right and left wheels are controlled so as to have the same steering angle, can also obtain a vehicle acceleration which is equivalent to that of the four-wheel-drive vehicle. As described above, in a critical traveling state (wherein the effective road friction =1), the front-wheel and rear-wheel steering vehicle in which the right and left wheels have the same steering angle can also obtain the vehicle acceleration which is equivalent to that of the four-wheel independent steering by using the slip area further than the edge of the friction circle. This is the result of derivation based on the brush model which theoretically describes the tire force. However, in actual tire characteristics, tire force may decrease in the slip area as shown in FIG. 12. When the solution for the four-wheel independent steering is realized in the front-wheel and rear-wheel steering vehicle, the vehicle acceleration may decrease by a corresponding amount.

Figure 13:
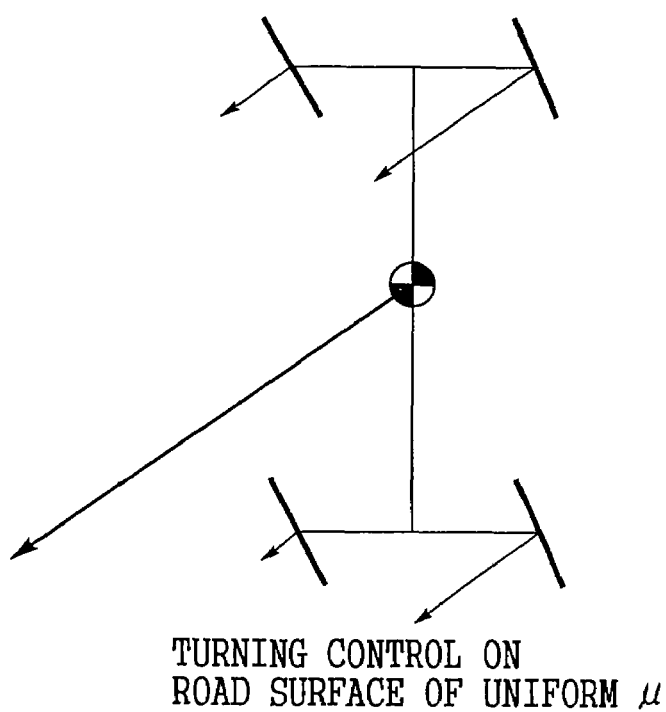
FIG. 13 is a diagram showing vectors of the tire forces of respective wheels and the steering angles of the respective wheels after convergence, when the brake is applied to a vehicle which is turning on a road surface of uniform $\mu$.

FIG. 13 is a diagram showing solutions (vectors of forces generated by the respective wheels and the vehicle body, and the steering angles thereof) for the four-wheel-drive vehicle and the front-wheel and rear-wheel steering vehicle when the brake is applied to the vehicles during turning on a flat road surface having a μ of 0.85. There is no difference between the four-wheel independent steering and the front-wheel and rear-wheel steering on the road surface having a uniform μ, and both the four-wheel independent steering and the front-wheel and rear-wheel steering obtain the solution of $q_i = 0$.

Considering that almost no difference is found between the four-wheel independent steering and the front-wheel and rear-wheel steering vehicle on the road surface having a uniform μ, and that the direction $q_i$ of the force generated by each wheel is relatively small, the following control rule for the front-wheel and rear-wheel steering may be used in critical and pre-critical traveling states.

First, in the pre-critical traveling state, the maximum value of the road surface μ of each wheel is used, and control when the road surface μ is maximum and uniform is carried out. When the wheels do not have a uniform μ, the actual effective road friction does not become uniform, but the magnitude of the tire force of each wheel becomes proportional to the load distribution ratio, and the direction $q_i$ of the force generated by each wheel becomes relatively small. Therefore, well-balanced cooperation of steering and braking, and of steering and driving can be expected.

The control rule for the four-wheel independent steering is used when the wheel having a low μ has reached its limit, namely, in the case of the following formula (69).

$$F_{iReal} < \gamma F_i \quad (69)$$

γ is calculated from the solution $q_i$ of the recurrence formula (64) and calculated as follows.

$$\gamma = \frac{F}{F_1 \cos q_1 + F_2 \cos q_2 + F_3 \cos q_3 + F_4 \cos q_4}. \quad (70)$$

$F_i$ is the magnitude of the tire force when μ of the road surface is assumed to be large, and $F_{iReal}$ is an actual magnitude of the tire force of a wheel having a small μ. $\gamma F_i$ in the process of deriving the control rule for the four-wheel independent steering can be obtained as $F_{1Real}$. For example, when wheels 1 and 3 (the left front wheel and the left rear wheel) have reached their limits, the constraints for the wheels are represented as follows.

$$F_{1Real} \sin q_1 + \gamma F_2 \sin q_2 + F_{3Real} \sin q_3 + \gamma F_4 \sin q_4 = 0 \quad (71)$$

$$-a_1 F_{1Real} \cos q_1 - a_2 \gamma F_2 \cos q_2 - \\ a_3 F_{3Real} \cos q_3 - a_4 \gamma F_4 \cos q_4 + b_1 F_{1Real} \sin q_1 + \\ b_2 \gamma F_2 \sin q_2 + b_3 F_{3Real} \sin q_3 + b_4 \gamma F_4 \sin q_4 = M_z \quad (72)$$

$$F_{1Real} \sin q_1 + \gamma F_2 \sin q_2 + F_{3Real} \sin q_3 + \gamma F_4 \sin q_4 = F \quad (73)$$

Thus, this becomes a problem of determining $q_i$ which satisfies the formulae (71) to (73) and minimizes γ. While the nonlinear optimization may be used, the following recurrence formula may also be used:

$$\begin{bmatrix} q_1 \\ q_2 \\ q_3 \\ q_4 \end{bmatrix} = \operatorname{diag}\left[ \frac{1}{\sqrt{F_{1Real}}} \quad \frac{1}{\sqrt{\gamma_0 F_2}} \quad \frac{1}{\sqrt{F_{3Real}}} \quad \frac{1}{\sqrt{\gamma_0 F_4}} \right]. \quad (74)$$

$$\begin{bmatrix} \sqrt{F_{1Real}} \cos q_{10} & \sqrt{\gamma_0 F_2} \cos q_{20} \\ \sqrt{F_{1Real}}(a_1 \sin q_{10} + b_1 \cos q_{10}) & \sqrt{\gamma_0 F_2}(a_2 \sin q_{20} + b_2 \cos q_{20}) \\ \sqrt{F_{3Real}} \cos q_{30} & \sqrt{\gamma_0 F_4} \cos q_{40} \\ \sqrt{F_{3Real}}(a_3 \sin q_{30} + b_3 \cos q_{30}) & \sqrt{\gamma_0 F_4}(a_4 \sin q_{40} + b_4 \cos q_{40}) \end{bmatrix}^+ \cdot \begin{bmatrix} d_3 \\ d_4 \end{bmatrix}$$

provided that $$d_3 = \sum_{i=1,3} F_{iReal}(q_{i0} \cos q_{i0} - \sin q_{i0}) + \\ \sum_{i=2,4} \gamma_0 F_i (q_{i0} \cos q_{i0} - \sin q_{i0}) \quad (75)$$

$$d_4 = M_z + \sum_{i=1,3} F_{iReal}\{(a_i + b_i q_{i0}) \cos q_{i0} + (a_i q_{i0} - b_i) \sin q_{i0}\} + \\ \sum_{i=2,4} \gamma_0 F_i \{(a_i + b_i q_{i0}) \cos q_{i0} + (a_i q_{i0} - b_i) \sin q_{i0}\}$$

and $$\gamma = \frac{F - \sum_{i=1,3} F_{iReal} \cos q_i}{\sum_{i=2,4} F_i \cos q_i}.$$

The subscript "0" in $\gamma_0$ and $F_{i0}$ indicates a value calculated in the previous step. Based on $q_i$ thus derived, the braking force, the driving force and the steering angle can be derived from the formulae (45) to (52) for the wheel of large μ, and, for the wheel of small μ, the braking force, the driving force and the steering angle can be derived from the formulae (65) to (68), considering that the slip of the wheel of large μ is as follows.

$$k_i = \frac{3F_i}{K_s}\left(1 - (1 - \gamma)^{\frac{1}{3}}\right) \quad (76)$$

As described above, when the control rule for the vehicle motion according to the present embodiment is derived with the direction of the tire force of each wheel being used as the control variable, a nonlinear tire model does not need to be included in the optimal calculation, and the number of control variables is smaller, as compared to a conventional method in which the slip angle and the slip ratio of each wheel are used as the control variables. Therefore, the amount of calculation of the control rule is smaller than that of the conventional method, and the use of the control rule can be expanded to the four-wheel independent steering, which is a system of a higher degree of freedom.

In the four-wheel-drive vehicle, the case has been described in which the control rule which equalizes and minimizes the effective road friction of each wheel is derived. This means maximizing friction allowance of each wheel in combinations of control of each wheel for obtaining desired force and moment. Therefore, improvement in safety and resistance to failure can be expected.

Moreover, the case has been described in which the control rule which equalizes the effective road friction of each wheel and the control rule which makes the tire force of each wheel proportional to the load distribution are derived in the front-wheel and rear-wheel steering vehicle in which the right and left wheels have the same steering angle. These control rules correspond to each other when the front-wheel and rear-wheel steering vehicle travels on the road surface of uniform μ, and substantially correspond to the solution of the above-described control rule for the four-wheel-drive steering. Thus, this means that, when the front-wheel and rear-wheel steering vehicle travels on the road surface of uniform μ, these control rules maximize friction allowance of each wheel in combinations of control of each wheel for obtaining desired force and moment. Therefore, improvement in safety and resistance to failure can be expected.

Further, in the control rule for making the tire force proportional to the load distribution in the front-wheel and rear-wheel steering vehicle in which the right and left wheels have the same steering angle, when the wheel of small μ has reached its limit of friction, the direction of the force generated by each wheel, which direction is derived based on the control rule for the four-wheel-drive vehicle, is realized by the front-wheel and rear-wheel steering vehicle.

Figure 14:
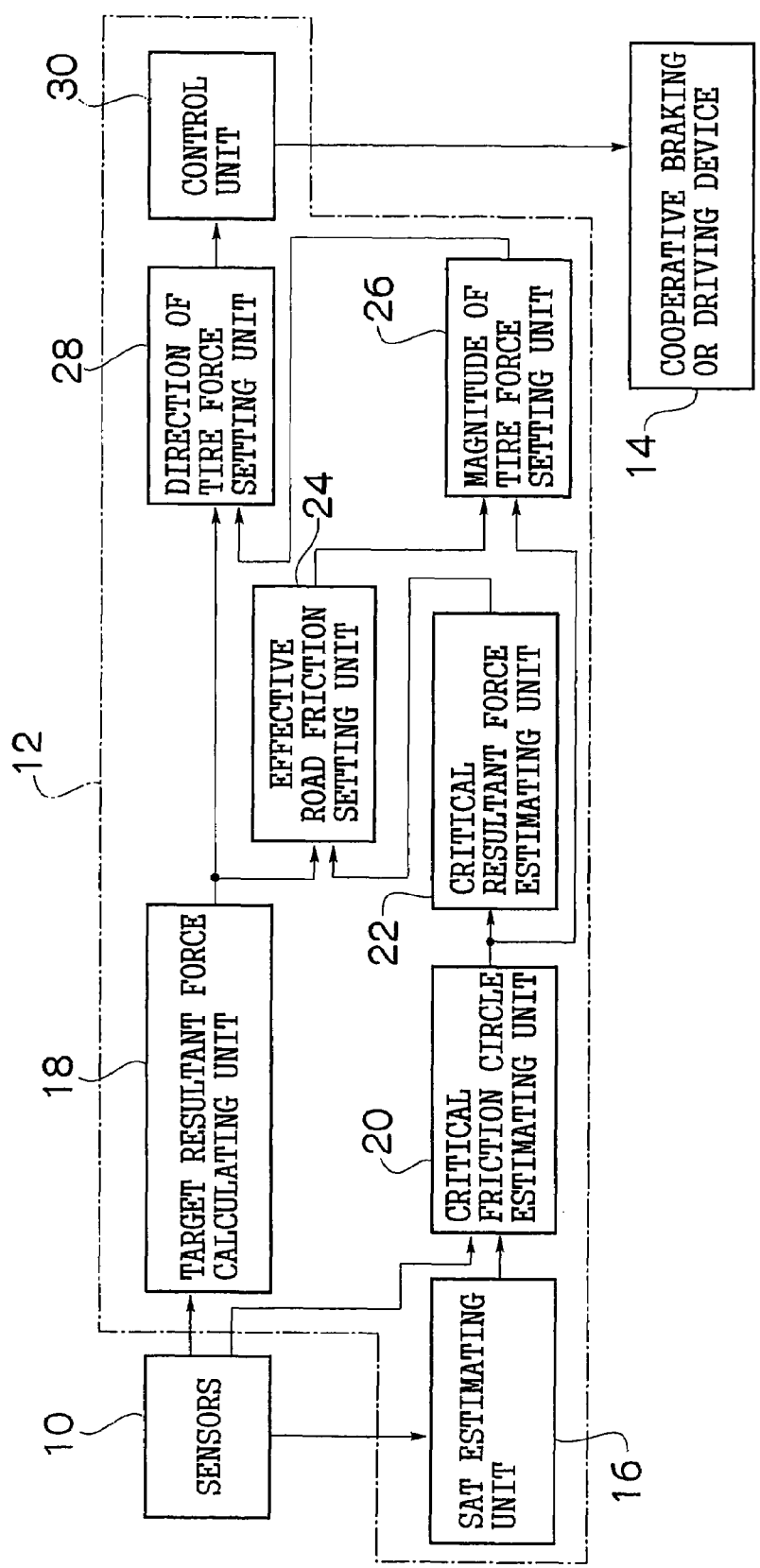
FIG. 14 is a block diagram showing a second specific structure according to the embodiment of the present invention.

Next, a second specific structure of the present embodiment using the above principle will be described with reference to FIG. 14.

In the present embodiment, the present invention is applied to a vehicle having an electric power steering device mounted therein. As shown in the drawing, the present embodiment is formed by a group of sensors 10 mounted in the vehicle and including a steering angle sensor for detecting a steering angle from a rotation angle of a steering shaft of the electric power steering device, an assist torque sensor for detecting power assist torque from electric current passing through the electric power steering device, a torque sensor for detecting steering torque, a vehicle speed sensor for detecting the speed of the vehicle, an accelerator stroke sensor for detecting an accelerator stroke, a braking effort sensor for detecting braking effort, and a wheel speed sensor for detecting the rotation speed of a wheel; a controller 12 formed by microcomputers; and a cooperative braking and driving device 14 which is connected to the controller 12 and cooperatively controls the steering angle, and braking and driving.

The controller 12 formed by the microcomputers is controlled so as to perform a plurality of functions in accordance with programs stored in advance. When the controller 12 is shown in a block functional diagram, the controller 12 is formed by a SAT estimating unit 16 for estimating the SAT; a target resultant force calculating unit 18 for calculating the magnitude and direction of the target resultant force; a critical friction circle estimating unit 20 for estimating the magnitude (radius) of the critical friction circle of each wheel; a critical resultant force estimating unit 22 for estimating the magnitude of critical resultant force; an effective road friction setting unit 24; a magnitude of tire force setting unit 26 for setting the magnitude of tire force; a direction of tire force setting unit 28 for setting the direction of the tire force of each wheel; and a control unit 30 connected to the cooperative braking and driving device 14.

The SAT estimating unit 16 estimates SAT based on steering torque detected by the torque sensor and assist torque detected by the assist torque sensor.

The target resultant force calculating unit 18 calculates the magnitude and direction of the target resultant force and the yaw moment $M_z$ to be applied to the vehicle body in order to obtain a vehicle body motion that the driver desires, from the steering angle, the vehicle speed, the accelerator stroke, the braking effort, and the like which have been detected by the respective sensors.

For example, a resultant force and a yaw moment that are necessary to approximate to zero deviations from a yaw angle speed, which is a target vehicle motion state variable, and from a measured value or an estimate of the slip angle of the vehicle body, can be used as the magnitude and direction of the target resultant force and the yaw moment $M_z$.

The critical friction circle estimating unit 20 estimates the magnitude of the critical friction circle of each wheel based on the SAT estimated by the SAT estimating unit 16 or the wheel speed detected by the wheel speed sensor.

The critical resultant force estimating unit 22 estimates the magnitude of the critical resultant force from the magnitude of the critical friction circle of each wheel estimated by the critical friction circle estimating unit 20. The estimation may be carried out by simply regarding the sum of the critical friction forces of the respective wheels as the critical resultant force, or by regarding as the critical resultant force a value obtained by multiplying the sum of the critical friction forces of the respective wheels by a constant. Alternatively, the estimation may be carried out by first determining the angle $q_i$ based on the formulae (21) to (24) from a direction $\theta$ of the target resultant force and a target yaw moment, and then calculating a critical resultant force J based on the formula (11).

The effective road friction setting unit 24 sets as the effective road friction $\gamma$ the ratio of the magnitude of the target resultant force to that of the critical resultant force. However, when the target resultant force exceeds the critical resultant force, the effective road friction is set as 1.

The magnitude of tire force setting unit 26 sets the magnitude of the tire force used at each wheel by multiplying the critical friction circle by the effective road friction.

The direction of the tire force setting unit 28 uses the direction $\theta$ of the target resultant force and the magnitude $\gamma F_i$ of the tire force of each wheel used, to determine the angle $q_i$ based on the following formula obtained by replacing $F_i$ in the formulae (20) to (24) by $\gamma F_i$, and outputs the magnitude $\gamma F_i$ and the direction $(q_i+\theta)$ of the tire force of each wheel:

$$\begin{bmatrix} q_1 \\ q_2 \\ q_3 \\ q_4 \end{bmatrix} = \operatorname{diag}\begin{bmatrix} \dfrac{1}{\sqrt{F_1}} & \dfrac{1}{\sqrt{F_2}} & \dfrac{1}{\sqrt{F_3}} & \dfrac{1}{\sqrt{F_4}} \end{bmatrix}. \tag{77}$$

$$\begin{bmatrix} \sqrt{F_1} & \sqrt{F_2} & \sqrt{F_3} & \sqrt{F_4} \\ b_1\sqrt{F_1} & b_2\sqrt{F_2} & b_3\sqrt{F_3} & b_4\sqrt{F_4} \end{bmatrix}^+ \cdot$$

$$\begin{bmatrix} \dfrac{M_z}{\gamma} + (a_1F_1 + a_2F_2 + a_3F_3 + a_4F_4) \end{bmatrix}$$

$$= \dfrac{\dfrac{M_z}{\gamma} + (a_1F_1 + a_2F_2 + a_3F_3 + a_4F_4)}{b_1c_1F_1 + b_2c_2F_2 + b_3c_3F_3 + b_4c_4F_4} \cdot \begin{bmatrix} c_1 \\ c_2 \\ c_3 \\ c_4 \end{bmatrix}$$

provided that $$c_1 = (b_1-b_2)F_2 + (b_1-b_3)F_3 + (b_1-b_4)F_4 \tag{78}$$

$$c_2 = (b_2-b_1)F_1 + (b_2-b_3)F_3 + (b_2-b_4)F_4 \tag{79}$$

$$c_3 = (b_3-b_1)F_1 + (b_3-b_2)F_2 + (b_3-b_4)F_4 \tag{80}$$

$$c_4 = (b_4-b_1)F_1 + (b_4-b_2)F_2 + (b_4-b_3)F_3 \tag{81}$$

The control unit 30 determines the steering angle and the braking force, or the steering angle and the driving force of each wheel based on the magnitude $\gamma F_i$ and the direction $(q_i+\theta)$ of the tire force of each wheel, and controls the steering device and the braking actuator, or the steering device and the driving actuator. The braking force or the driving force of each wheel can be derived as follows from the magnitude $\gamma F_i$ and the direction $(q_i+\theta)$ of the tire force of each wheel.

$$F_{xi} = \gamma F_i \cos(q_i+\theta) \tag{82}$$

Similarly, lateral force of each wheel can be derived from the following formula.

$$F_{yi} = \gamma F_i \sin(q_i+\theta) \tag{83}$$

The steering angle of each wheel can be calculated, for example, based on the brush model and the vehicle motion model. The brush model is the model which describes the characteristic of the tire force based on the theoretical formula. Assuming that the tire force is generated in accordance with the brush model, the slip angle $\beta_i$ can be calculated by the following formula, using the critical friction circle $F_i$, the effective road friction $\gamma$, and the direction of the tire force $(q_i+\theta)$:

$$\beta_i = \tan^{-1}\left[\frac{K_s}{K_\beta} \cdot \frac{-k_i \sin(q_i + \theta)}{1 - k_i \cos(q_i + \theta)}\right] \quad (84)$$

provided that $$k_i = \frac{3F_i}{K_s}[1 - (1-\gamma)^{1/3}]. \quad (85)$$

In the above formulae, $K_s$ represents driving stiffness, and $K_\beta$ represents cornering stiffness. Further, the steering angle of each wheel is calculated from the slip angle $\beta_i$ based on the vehicle motion model. Namely, the steering angle can be calculated as follows by using the yaw angle speed $r_0$ and the vehicle body slip angle $\beta_0$, which are calculated as the target vehicle motion state variables from the vehicle speed v, the steering angle, the accelerator stroke, the braking effort, and the like.

$$\delta_1 = \beta_0 + \frac{L_f}{v}r_0 - \beta_1 \quad (86)$$

$$\delta_2 = \beta_0 + \frac{L_f}{v}r_0 - \beta_2 \quad (87)$$

$$\delta_3 = \beta_0 - \frac{L_r}{v}r_0 - \beta_3 \quad (88)$$

$$\delta_4 = \beta_0 - \frac{L_r}{v}r_0 - \beta_4 \quad (89)$$

When the cooperative control of steering and braking and of steering and driving is carried out based on this type of control, the effective road friction of each wheel can be made uniform all the time, and motion performance allowing the greatest robust against disturbance such as a road surface or cross wind can be exhibited.

Further, in the present embodiment, the effective road friction can be independently set for the front wheel and the rear wheel. In this case, the following formula is constructed, wherein the effective road frictions of the front wheel and the rear wheel are $\gamma_f$ and $\gamma_r$ respectively:

$$\begin{bmatrix} q_1 \\ q_2 \\ q_3 \\ q_4 \end{bmatrix} = \frac{M_z + a_1\gamma_f F_1 + a_2\gamma_f F_2 + a_3\gamma_r F_3 + a_4\gamma_r F_4}{b_1c_1\gamma_f F_1 + b_2c_2\gamma_f F_2 + b_3c_3\gamma_r F_3 + b_4c_4\gamma_r F_4} \cdot \begin{bmatrix} c_1 \\ c_2 \\ c_3 \\ c_4 \end{bmatrix} \quad (100)$$

provided that $$c_1 = (b_1-b_2)\gamma_f F_2 + (b_1-b_3)\gamma_r F_3 + (b_1-b_4)\gamma_r F_4 \quad (101)$$

$$c_2 = (b_2-b_1)\gamma_f F_1 + (b_2-b_3)\gamma_r F_3 + (b_2-b_4)\gamma_r F_4 \quad (102)$$

$$c_3 = (b_3-b_1)\gamma_f F_1 + (b_3-b_2)\gamma_f F_2 + (b_3-b_4)\gamma_r F_4 \quad (103)$$

$$c_4 = (b_4-b_1)\gamma_f F_1 + (b_4-b_2)\gamma_f F_2 + (b_4-b_3)\gamma_r F_3 \quad (104)$$

As described above, the effective road friction is independently set for the front wheel and the rear wheel. Namely, the effective road frictions of the front wheel and the rear wheel are made to differ from each other. As a result, for example, by setting the effective road friction of the rear wheel smaller than that of the front wheel, friction allowance of the rear wheel is increased, thereby realizing motion control which is highly effective in suppressing spin and emphasizes safety.

Further, the formulae (101) to (104) respectively represent the sum of products of the distance from the position of the object wheel to the position of the other wheel in the direction of the resultant force of the vehicle body, and the magnitude of the tire force to be outputted, which tire force is obtained in consideration of the effective road friction. As a result, the formulae (101) to (104) represent that the angle formed by the direction of the tire force of each wheel and the direction of the resultant force of the vehicle body is proportional to the sum of the products of the distance from the position of the object wheel to the position of the other wheel in the direction of the resultant force of the vehicle body, and the magnitude of the tire force to be outputted.

Further, considering that $a_i$ or $b_i$ is a function of the direction $\theta$ of the resultant force of the vehicle body, the formulae (101) to (104) represent that the angle formed by the direction of the force generated by each wheel and the direction of the resultant force of the vehicle body can be described as a function of the direction of the resultant force of the vehicle body and the magnitude of the tire force of each wheel to be outputted.

Next, an embodiment will be described in which the present invention is applied to the normal four-wheel vehicle, which is controlled such that the steering angle is the same for the right and left wheels.

In the case of the conventional four-wheel vehicle having the same steering angle for the right and left wheels, constraints represented by the following formulae (105) and (106) and indicating that the right and left wheels have the same slip angle are further added. These constraints can further be organized into the following formulae (107) and (108).

$$\tan^{-1}\left(\frac{K_s}{K_\beta} \cdot \frac{-k_1\sin(q_1+\theta)}{1-k_1\cos(q_1+\theta)}\right) = \tan^{-1}\left(\frac{K_s}{K_\beta} \cdot \frac{-k_2\sin(q_2+\theta)}{1-k_2\cos(q_2+\theta)}\right) \quad (105)$$

$$\tan^{-1}\left(\frac{K_s}{K_\beta} \cdot \frac{-k_3\sin(q_3+\theta)}{1-k_3\cos(q_3+\theta)}\right) = \tan^{-1}\left(\frac{K_s}{K_\beta} \cdot \frac{-k_4\sin(q_4+\theta)}{1-k_4\cos(q_4+\theta)}\right) \quad (106)$$

$$k_2\sin(q_2+\theta) - k_1\sin(q_1+\theta) - k_1k_2\sin(q_2-q_1) = 0 \quad (107)$$

$$k_4\sin(q_4+\theta) - k_3\sin(q_3+\theta) - k_3k_4\sin(q_4-q_3) = 0 \quad (108)$$

After primary approximation, these constraints are represented by the following formulae (109) and (110).

$$-k_1(\cos\theta - k_2)q_1 + k_2(\cos\theta - k_1)q_2 = (k_1-k_2)\sin\theta \quad (109)$$

$$-k_3(\cos\theta - k_4)q_3 + k_4(\cos\theta - k_3)q_4 = (k_3-k_4)\sin\theta \quad (110)$$

Furthermore, these constraints are represented by using $p_i$ as follows.

$$-\frac{k_1}{\sqrt{F_1}}(\cos\theta - k_2)p_1 + \frac{k_2}{\sqrt{F_2}}(\cos\theta - k_1)p_2 = (k_1-k_2)\sin\theta \quad (111)$$

$$-\frac{k_3}{\sqrt{F_3}}(\cos\theta - k_4)p_3 + \frac{k_4}{\sqrt{F_4}}(\cos\theta - k_3)p_4 = (k_3-k_4)\sin\theta \quad (112)$$

By considering other constraints represented by the following formulae (113) and (114) when the vehicle travels with an effective road friction $\gamma$, the angle $q_i$ formed by the direction of the resultant force and the force generated by a single wheel can be uniquely determined as shown in the following formula (115).

$$\sqrt{F_1}p_1 + \sqrt{F_2}p_2 + \sqrt{F_3}p_3 + \sqrt{F_4}p_4 \tag{113}$$

$$b_1\sqrt{F_1}\,p_1 + b_2\sqrt{F_2}\,p_2 + b_3\sqrt{F_3}\,p_3 + b_4\sqrt{F_4}\,p_4 = \tag{114}$$
$$\frac{M_z}{\gamma} + (a_1 F_1 + a_2 F_2 + a_3 F_3 + a_4 F_4)$$

and left wheels. The value $q_i$ obtained by formula (115) is calculated by primary approximation and may also be used as an initial value to numerically solve a corresponding nonlinear equation, and the control is carried out based on the solution of the equation. In this case, control of higher accuracy can be achieved.

When the cooperation of the steering control and the braking and driving control is carried out based on this type of control, the effective road friction of each wheel can be made uniform all the time, and motion performance allowing the greatest robust against disturbance such as a road surface or cross wind can be exhibited.

Moreover, even when the same steering angle is used for the right and left wheels, the effective road friction of each $$\begin{bmatrix} q_1 \\ q_2 \\ q_3 \\ q_4 \end{bmatrix} = \operatorname{diag}\left[ \frac{1}{\sqrt{F_1}} \quad \frac{1}{\sqrt{F_2}} \quad \frac{1}{\sqrt{F_3}} \quad \frac{1}{\sqrt{F_4}} \right] \cdot \tag{115}$$

$$\begin{bmatrix} \sqrt{F_1} & \sqrt{F_2} & \sqrt{F_3} & \sqrt{F_4} \\ b_1\sqrt{F_1} & b_2\sqrt{F_2} & b_3\sqrt{F_3} & b_4\sqrt{F_4} \\ -\dfrac{k_1}{\sqrt{F_1}}(\cos\theta - k_2) & \dfrac{k_2}{\sqrt{F_2}}(\cos\theta - k_1) & 0 & 0 \\ 0 & 0 & -\dfrac{k_3}{\sqrt{F_3}}(\cos\theta - k_4) & \dfrac{k_4}{\sqrt{F_4}}(\cos\theta - k_3) \end{bmatrix}^{-1}$$

$$\begin{bmatrix} 0 \\ \dfrac{M_z}{\gamma} + a_1 F_1 + a_2 F_2 + a_3 F_3 + a_4 F_4 \\ (k_1 - k_2)\sin\theta \\ (k_3 - k_4)\sin\theta \end{bmatrix}$$

The braking force, the driving force and the steering angle of each wheel at this time are calculated by the formulae (82) and (84) to (89). However, the same value is calculated in the formulae (87) and (89) for the steering angles of the right and left wheels. The value $q_i$ obtained by formula (115) is wheel can be set independently. In this case, the angle $q_i$ formed by the direction of the resultant force and the force generated by a single wheel is represented by the following formula.

$$\begin{bmatrix} q_1 \\ q_2 \\ q_3 \\ q_4 \end{bmatrix} = \operatorname{diag}\left[ \frac{1}{\sqrt{F_1\gamma_f}} \quad \frac{1}{\sqrt{F_2\gamma_f}} \quad \frac{1}{\sqrt{F_3\gamma_r}} \quad \frac{1}{\sqrt{F_4\gamma_r}} \right] \cdot \tag{116}$$

$$\begin{bmatrix} \sqrt{F_1\gamma_f} & \sqrt{F_2\gamma_f} & \sqrt{F_3\gamma_r} & \sqrt{F_4\gamma_r} \\ b_1\sqrt{F_1\gamma_f} & b_2\sqrt{F_2\gamma_f} & b_3\sqrt{F_3\gamma_r} & b_4\sqrt{F_4\gamma_r} \\ -\dfrac{k_1}{\sqrt{F_1\gamma_f}}(\cos\theta - k_2) & \dfrac{k_2}{\sqrt{F_2\gamma_f}}(\cos\theta - k_1) & 0 & 0 \\ 0 & 0 & -\dfrac{k_3}{\sqrt{F_3\gamma_r}}(\cos\theta - k_4) & \dfrac{k_4}{\sqrt{F_4\gamma_r}}(\cos\theta - k_3) \end{bmatrix}^{-1}$$

$$\begin{bmatrix} 0 \\ M_z + (a_1 F_1\gamma_f + a_2 F_2\gamma_f + a_3 F_3\gamma_r + a_4 F_4\gamma_r) \\ (k_1 - k_2)\sin\theta \\ (k_3 - k_4)\sin\theta \end{bmatrix}$$

$$= \begin{bmatrix} F_1\gamma_f & F_2\gamma_f & F_3\gamma_r & F_4\gamma_r \\ b_1 F_1\gamma_f & b_2 F_2\gamma_f & b_3 F_3\gamma_r & b_4 F_4\gamma_r \\ -k_1(\cos\theta - k_2) & k_2(\cos\theta - k_1) & 0 & 0 \\ 0 & 0 & -k_3(\cos\theta - k_4) & k_4(\cos\theta - k_3) \end{bmatrix}^{-1} \cdot$$

$$\begin{bmatrix} 0 \\ M_z + (a_1 F_1 \gamma_f + a_2 F_2 \gamma_f + a_3 F_3 \gamma_r + a_4 F_4 \gamma_r) \\ (k_1 - k_2)\sin\theta \\ (k_3 - k_4)\sin\theta \end{bmatrix}$$

The present embodiment can also be applied to a vehicle structured such that only the front wheels or the rear wheels can be independently steered. For example, in a case of a vehicle in which each of the rear wheels can be independently steered, the angle $q_i$ formed by the direction of the resultant force and the force generated by a single wheel can be represented by the following formula.

$$\begin{bmatrix} q_1 \\ q_2 \\ q_3 \\ q_4 \end{bmatrix} = diag\begin{bmatrix} \dfrac{1}{\sqrt{F_1\gamma_f}} & \dfrac{1}{\sqrt{F_2\gamma_f}} & \dfrac{1}{\sqrt{F_3\gamma_r}} & \dfrac{1}{\sqrt{F_4\gamma_r}} \end{bmatrix} \cdot$$

$$\begin{bmatrix} \sqrt{F_1\gamma_f} & \sqrt{F_2\gamma_f} & \sqrt{F_3\gamma_r} & \sqrt{F_4\gamma_r} \\ b_1\sqrt{F_1\gamma_f} & b_2\sqrt{F_2\gamma_f} & b_3\sqrt{F_3\gamma_r} & b_4\sqrt{F_4\gamma_r} \\ -\dfrac{k_1}{\sqrt{F_1\gamma_f}}(\cos\theta - k_2) & \dfrac{k_2}{\sqrt{F_2\gamma_f}}(\cos\theta - k_1) & 0 & 0 \end{bmatrix}^+ \cdot$$

$$\begin{bmatrix} M_z + (a_1 F_1 \gamma_f + a_2 F_2 \gamma_f + a_3 F_3 \gamma_r + a_4 F_4 \gamma_r) \\ (k_1 - k_2)\sin\theta \end{bmatrix}$$

(117)

The magnitude of the tire force in the present embodiment can also be represented by the magnitude of the friction circle.

What is claimed is:

1. A vehicle control method comprising:
   calculating a first value of a physical quantity, for substantially uniformly maximizing the grip margin of each wheel, which relates to a tire force of each wheel and optimizes an effective road friction of each wheel, based on a target resultant force to be applied to a vehicle body in order to obtain vehicle body motion that a driver desires, and a constraint including as parameters a magnitude of a critical friction circle of each wheel;
   calculating, based on the calculated first value of the physical quantity relating to the tire force of each wheel, a first control variable for controlling braking force and driving force of each wheel, or a second control variable for controlling the first control variable and a steering angle of each wheel; and
   controlling (A) the braking force and driving force of each wheel based on the first control variable, or controlling (A) the braking force and driving force of each wheel and (B) the steering angle of each wheel based on the first and second control variables.

2. The method of claim 1, wherein the constraint is represented by a formula indicating that no resultant force is generated in a direction orthogonal to a direction of the target resultant force, and a formula indicating that a moment around the center of gravity of the vehicle is equal to a desired moment.

3. The method of claim 2, wherein the constraint is represented by formulae, the number of which is less than that of wheels, or a linearized formula.

4. The method of claim 2, including the steps of
   calculating an initial value based upon another value of the physical quantity relating to the tire force of each wheel, which another value of the physical quantity satisfies a first approximation formula of a formula defining the constraint and optimizes a secondary performance function of the another value of the physical quantity which represents the target resultant force and includes the magnitude of the critical friction circle of each wheel and the first value of the physical quantity relating to the tire force of each wheel;
   linearizing the formula defining the constraint by using the calculated initial value;
   calculating, as an approximate solution, yet another value of the physical quantity relating to the tire force of each wheel, which yet another value of the physical quantity satisfies the linearized formula of the constraint and optimizes the secondary performance function; and
   calculating the first value of the physical quantity which relates to the tire force of each wheel and optimizes the effective road friction of each wheel by using the calculated approximate solution to repeat the linearization of the formula defining the constraint and the calculation of the approximate solution.

5. The method of claim 4, wherein the formula defining the constraint is linearized by Taylor expansion around the initial value or the approximate solution.

6. The method of claim 1, wherein the magnitude of the critical friction circle of each wheel is determined based on an estimate or a virtual value of $\mu$ of each wheel and a load of each wheel.

7. The method of claim 1, wherein the steering angle is controlled so as to be the same for the right and left wheels.

8. A vehicle control method comprising:
calculating a first value of a physical quantity, for substantially uniformly maximizing the grip margin of each wheel, which relates to a tire force of each wheel and optimizes an effective road friction of each wheel, based on a target resultant force to be applied to a vehicle body in order to obtain vehicle body motion that a driver desires, and a constraint including as parameters a magnitude of a critical friction circle of each wheel;
calculating, based on the calculated first value of the physical quantity relating to the tire force of each wheel, a first control variable for controlling braking force and driving force of each wheel, or a second control variable for controlling the first control variable and a steering angle of each wheel; and
controlling (A) the braking force and driving force of each wheel based on the first control variable, or controlling (A) the braking force and driving force of each wheel and (B) the steering angle of each wheel based on the first and second control variables,
wherein the constraint is represented by a formula indicating that no resultant force is generated in a direction orthogonal to a direction of the target resultant force, and a formula indicating that a moment around the center of gravity of the vehicle is equal to a desired moment, wherein:
the target resultant force is represented by a secondary performance function of another value of the physical quantity including the magnitude of the critical friction circle of each wheel and the first value of the physical quantity relating to the tire force of each wheel; and
calculating the another value of the physical quantity relating to the tire force of each wheel, which another value of the physical quantity satisfies a first approximation formula of a formula defining the constraint and optimizes the secondary performance function of the another value of the physical quantity, is calculated as the first value of the physical quantity which relates to the tire force of each wheel and optimizes the effective road friction of each wheel.

9. A vehicle control method comprising:
calculating a first physical quantity which relates to a tire force of each wheel and optimizes an effective road friction of each wheel, based on a target resultant force to be applied to a vehicle body in order to obtain vehicle body motion that a driver desires, and a constraint including as parameters a magnitude of a critical friction circle of each wheel;
calculating, based on the calculated first physical quantity relating to the tire force of each wheel, a first control variable for controlling at least one of braking force and driving force of each wheel, or a second control variable for controlling the first control variable and a steering angle of each wheel; and
controlling (A) the at least one of braking force and driving force of each wheel based on the first control variable, or controlling (A) the at least one of braking force and driving force of each wheel and (B) the steering angle of each wheel based on the first and second control variables, wherein:
the first physical quantity relating to the tire force is a direction of the tire force; and
the effective road friction of each wheel, the calculated direction of the tire force of each wheel, and the magnitude of the critical friction circle of each wheel are used to calculate a slip angle based on a brush model, and the calculated slip angle is used to calculate the second control variable based on a vehicle motion model.

10. The method of claim 9, wherein the direction of the tire force which is generated by each wheel is defined as a value, that is the sum of products which are calculated for each of the other wheels, of a distance from the position of an object wheel to the position of the respective other wheel in the direction of the target resultant force, and the magnitude of the critical friction circle of the respective other wheel, with the direction of the target resultant force acting on the vehicle body being calculated with the resultant force of the tire forces of the respective wheels being used as a reference.

11. A vehicle control method comprising:
calculating a first physical quantity which relates to a tire force of each wheel and optimizes an effective road friction of each wheel, based on a target resultant force to be applied to a vehicle body in order to obtain vehicle body motion that a driver desires, and a constraint including as parameters a magnitude of a critical friction circle of each wheel;
calculating, based on the calculated first physical quantity relating to the tire force of each wheel, a first control variable for controlling at least one of braking force and driving force of each wheel, or a second control variable for controlling the first control variable and a steering angle of each wheel; and
controlling (A) the at least one of braking force and driving force of each wheel based on the first control variable, or controlling (A) the at least one of braking force and driving force of each wheel and (B) the steering angle of each wheel based on the first and second control variables, wherein:
the first physical quantity relating to the tire force is a direction of the tire force; and
the direction of the tire force which optimizes the effective road friction of each wheel is one of a direction of the tire force which uniformly minimizes the effective road friction of each wheel, a direction of the tire force which makes the effective road friction of a front wheel differ from that of a rear wheel, and a direction of the tire force which makes a magnitude of the tire force of each wheel proportional to the load of the wheel.

12. The method of claim 11, further comprising using, for a wheel having a small $\mu$, the magnitude of the critical friction circle as the magnitude of the tire force, and using, for a wheel having a large $\mu$, the magnitude of the tire force which minimizes the effective road friction, when the magnitude of the tire force proportional to the load of the wheel cannot be obtained because each wheel has a different $\mu$ with respect to a road surface.

13. A vehicle control method comprising:
calculating a first physical quantity which relates to a tire force of each wheel and optimizes an effective road friction of each wheel, based on a target resultant force to be applied to a vehicle body in order to obtain vehicle body motion that a driver desires, and a constraint including as parameters a magnitude of a critical friction circle of each wheel;
calculating, based on the calculated first physical quantity relating to the tire force of each wheel, a first control variable for controlling at least one of braking force and driving force of each wheel, or a second control variable for controlling the first control variable and a steering angle of each wheel; and controlling (A) the at least one of braking force and driving force of each wheel based on the first control variable, or controlling (A) the at least one of braking force and driving force of each wheel and (B) the steering angle of each wheel based on the first and second control variables, wherein the effective road friction is represented by a magnitude of the target resultant force relative to a magnitude of a critical resultant force obtained from the magnitude of the critical friction circle of each wheel.

14. A vehicle control apparatus comprising:
target resultant force calculating means for calculating a target resultant force to be applied to a vehicle body in order to obtain a vehicle body motion that a driver desires;
critical friction circle estimating means for estimating a magnitude of a critical friction circle of each wheel;
tire force calculating means for calculating a first value of a physical quantity, for substantially uniformly maximizing the grip margin of each wheel, which relates to a tire force of each wheel and optimizes an effective road friction of each wheel, based on the target resultant force and a constraint including as parameters the magnitude of the critical friction circle of each wheel;
control variable calculating means for calculating, based on the calculated first value of the physical quantity relating to the tire force of each wheel, a first control variable for controlling at least one of braking force and driving force of each wheel, or a second control variable for controlling the first control variable and a steering angle of each wheel; and
control means for controlling (A) the at least one of braking force and driving force of each wheel based on the first control variable, or controlling (A) the at least one of braking force and driving force of each wheel and (B) the steering angle of each wheel based on the first and second control variables.

15. The apparatus of claim 14, wherein the constraint is represented by a formula indicating that no resultant force is generated in a direction orthogonal to a direction of the target resultant force, and a formula indicating that a moment around the center of gravity of the vehicle is equal to a desired moment.

16. The apparatus of claim 15, wherein the constraint is represented by formulae, the number of which is less than that of wheels, or a linearized formula.

17. The apparatus of claim 15, wherein:
the target resultant force is represented by a secondary performance function of another value of the physical quantity relating to the tire force of each wheel, including the magnitude of the critical friction circle of each wheel and the first value of the physical quantity relating to the tire force of each wheel; and
the tire force calculating means calculates the another value of the physical quantity relating to the tire force of each wheel, which another value of the physical quantity satisfies a first approximation formula of a formula defining the constraint and optimizes the secondary performance function of the another value of the physical quantity, as the first value of the physical quantity which relates to the tire force of each wheel and optimizes the effective road friction of each wheel.

18. The apparatus of claim 15, wherein:
the target resultant force is represented by a secondary performance function of the another value of the physical quantity including the magnitude of the critical friction circle of each wheel and the first value of the physical quantity relating to the tire force of each wheel; and the tire force calculating means calculates as an initial value another value of the physical quantity relating to the tire force of each wheel, which another value of the physical quantity satisfies a first approximation formula of a formula defining the constraint and optimizes the secondary performance function of the another value of the physical quantity, linearizes the formula defining the constraint by using the calculated initial value, calculates as an approximate solution yet another value of the physical quantity relating to the tire force of each wheel, which yet another value of the physical quantity satisfies the linearized formula of the constraint and optimizes the secondary performance function of the another value of the physical quantity, and calculates the first value of the physical quantity which relates to the tire force of each wheel and optimizes the effective road friction of each wheel by using the calculated approximate solution as the initial value to repeat the linearization of the formula defining the constraint and the calculation of the approximate solution.

19. The apparatus of claim 18, wherein the tire force calculating means linearizes the formula defining the constraint by Taylor expansion around the initial value of the approximate solution.

20. The apparatus of claim 14, wherein the critical friction circle estimating means determines the magnitude of the critical friction circle of each wheel based on an estimate or a virtual value of $\mu$ of each wheel and a load of each wheel.

21. The apparatus of claim 14, wherein the control means controls the steering angle so that the steering angle is the same for the right and left wheels.

22. A vehicle control apparatus comprising:
target resultant force calculating means for calculating a target resultant force to be applied to a vehicle body in order to obtain a vehicle body motion that a driver desires;
critical friction circle estimating means for estimating a magnitude of a critical friction circle of each wheel;
tire force calculating means for calculating a first physical quantity which relates to a tire force of each wheel and optimizes an effective road friction of each wheel, based on the target resultant force and a constraint including as parameters the magnitude of the critical friction circle of each wheel;
control variable calculating means for calculating, based on the calculated first physical quantity relating to the tire force of each wheel, a first control variable for controlling at least one of braking force and driving force of each wheel, or a second control variable for controlling the first control variable and a steering angle of each wheel; and
control means for controlling (A) the at least one of braking force and driving force of each wheel based on the first control variable, or controlling (A) the at least one of braking force and driving force of each wheel and (B) the steering angle of each wheel based on the first and second control variables, wherein:
the first physical quantity relating to the tire force is a direction of the tire force; and
the control variable calculating means calculates a slip angle based on a brush model by using the effective road friction of each wheel, the calculated direction of the tire force of each wheel, and the magnitude of the critical friction circle of each wheel, and calculates the second control variable based on a vehicle motion model by using the calculated slip angle.

23. The apparatus of claim 22, wherein the direction of the tire force which is generated by each wheel is defined as a value, that is a sum of products which are calculated for each of the other wheels, of a distance from the position of an object wheel to the position of the respective other wheel in the direction of the resultant force, and the magnitude of the critical friction circle of the respective other wheel, with the direction of the target resultant force acting on the vehicle body being calculated with the resultant force of the tire forces of the respective wheels being used as a reference.

24. A vehicle control apparatus comprising:
target resultant force calculating means for calculating a target resultant force to be applied to a vehicle body in order to obtain a vehicle body motion that a driver desires;
critical friction circle estimating means for estimating a magnitude of a critical friction circle of each wheel;
tire force calculating means for calculating a first physical quantity which relates to a tire force of each wheel and optimizes an effective road friction of each wheel, based on the target resultant force and a constraint including as parameters the magnitude of the critical friction circle of each wheel;
control variable calculating means for calculating, based on the calculated first physical quantity relating to the tire force of each wheel, a first control variable for controlling at least one of braking force and driving force of each wheel, or a second control variable for controlling the first control variable and a steering angle of each wheel; and
control means for controlling (A) the at least one of braking force and driving force of each wheel based on the first control variable, or controlling (A) the at least one of braking force and driving force of each wheel and (B) the steering angle of each wheel based on the first and second control variables, wherein:
the first physical quantity relating to the tire force is a direction of the tire force; and
the direction of the tire force which optimizes the effective road friction of each wheel is one of a direction of the tire force which uniformly minimizes the effective road friction of each wheel, a direction of the tire force which makes the effective road friction of a front wheel differ from that of a rear wheel, and a direction of the tire force which makes the magnitude of the tire force of each wheel proportional to a load of the wheel.

25. The apparatus of claim 24, wherein, when the magnitude of the tire force proportional to the load of the wheel cannot be obtained because each wheel has a different µ with respect to a road surface, the magnitude of the critical friction circle is used as the magnitude of the tire force for a wheel having a small µ, and the magnitude of the tire force which minimizes the effective road friction is used for a wheel having a large µ.

26. A vehicle control apparatus comprising:
target resultant force calculating means for calculating a target resultant force to be applied to a vehicle body in order to obtain a vehicle body motion that a driver desires;
critical friction circle estimating means for estimating a magnitude of a critical friction circle of each wheel;
tire force calculating means for calculating a first physical quantity which relates to a tire force of each wheel and optimizes an effective road friction of each wheel, based on the target resultant force and a constraint including as parameters the magnitude of the critical friction circle of each wheel;
control variable calculating means for calculating, based on the calculated first physical quantity relating to the tire force of each wheel, a first control variable for controlling at least one of braking force and driving force of each wheel, or a second control variable for controlling the first control variable and a steering angle of each wheel; and
control means for controlling (A) the at least one of braking force and driving force of each wheel based on the first control variable, or controlling (A) the at least one of braking force and driving force of each wheel and (B) the steering angle of each wheel based on the first and second control variables, wherein the effective road friction is represented by a magnitude of the target resultant force relative to a magnitude of a critical resultant force obtained from the magnitude of the critical friction circle of each wheel.

27. A vehicle control apparatus comprising:
target resultant force calculating means for calculating a target resultant force to be applied to a vehicle body in order to obtain a vehicle body motion that a driver desires;
critical friction circle estimating means for estimating a magnitude of a critical friction circle of each wheel;
critical resultant force estimating means for estimating a critical resultant force based on the magnitude of the critical friction circle of each wheel estimated by the critical friction circle estimating means;
effective road friction setting means for setting a ratio of the target resultant force to the critical resultant force as an effective road friction;
magnitude of tire force setting means for setting a magnitude of a tire force used at each wheel, which tire force is obtained by multiplying the magnitude of the critical friction circle of each wheel by the effective road friction;
direction of tire force setting means for setting a direction of the tire force generated by each wheel based on a value, that is a sum of products which are calculated for each of the other wheels, of a distance from the position of an object wheel to the position of the respective other wheel in a direction of the resultant force, and the magnitude of the critical friction circle of the respective other wheel, with the direction of the resultant force acting on the vehicle body being calculated with the resultant force generated by the tire force of each wheel being used as a reference; and
control means for controlling a steering angle of each wheel and at least one of braking force and driving force of each wheel based on the magnitude and direction of the tire force which have been set.

28. The apparatus of claim 27, wherein the control means comprises:
means for calculating, based on the calculated direction and magnitude of the tire force of each wheel, a first control variable for controlling at least one of braking force and driving force of each wheel, or a second control variable for controlling the first control variable and the steering angle of each wheel; and
means for controlling (A) the at least one of braking force and driving force of each wheel based on the first control variable, or controlling (A) the at least one of braking force and driving force of each wheel and (B) the steering angle of each wheel based on the first and second control variables.

* * * * *